United States Patent Office 3,642,798
Patented Feb. 15, 1972

3,642,798
CERTAIN 7-[β-OXY-γ-(N⁴-BENZYL-PIPERAZINO)-PROPYL-THEOPHYLLINES
Yoshihiro Nitta, Yoshiaki Ikeda, Toshiyuki Furue, and Takeshi Shimizu, Tokyo, Japan, assignors to Chugai Seiyaku Kabushiki Kaisha, Tokyo, Japan
No Drawing. Continuation of application Ser. No. 510,099, Nov. 26, 1965. This application Oct. 3, 1967, Ser. No. 672,644
Claims priority, application Japan, Dec. 8, 1964, 39/68,651; May 14, 1965, 40/27,910; June 26, 1965, 40/37,851; Oct. 6, 1965, 40/60,767
Int. Cl. C07d 57/36
U.S. Cl. 260—254       21 Claims This application is a continuation of application Ser. No. 510,099, Nov. 26, 1965.

The present invention relates to theophylline derivatives represented by the following general formula:

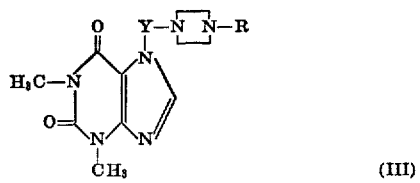

(III)

wherein

Y represents a lower alkylene chain having two or more carbon atoms, but in case of a lower alkylene chain of more than three carbon atoms, it may contain hydroxyl group or an acyloxy group at the position of the carbon atom which does not directly combine with nitrogen atom, and R represents hydrogen, a lower alkyl, a lower hydroxylalkyl, a lower aralkyl, a lower aralkyl containing a member selected from the group consisting of halogen lower alkyl and lower alkoxy as a substituent in the aromatic nucleus, a lower alkenyl, a lower naphthyl alkyl, a lower 2-pyridyl alkyl, a group —COX or a group —SO₂Z, wherein X represents a member selected from the group consisting of hydrogen, lower alkyl, lower alkoxy, aryl and aralkoxy and Z represents a member selected from the group consisting of a lower alkyl, aryl and lower aralkyl, and also to their salts.

The present invention relates also to a process for preparing the aforementioned theophylline derivatives and their salts.

An object of the present invention is to provide excellent medicines having coronary dilating effect. For hitherto known theophylline derivative having the same effect, it may be mentioned 7-(β-benzoyloxy-γ-diisobutylaminopropyl)-theophylline.

The compounds of the present invention have a satisfactory coronary dilating effect equal to or more than the aforesaid known theophylline derivative. In particular, acylated compounds of the present invention have more increased pharmaceutical activity, a compound in which R is aralkyl group and Y is acyloxy group, for example, shows 2–5 times activity comparing with aforesaid known theophylline derivative.

Another object of the present invention is to provide processes for producing advantageously the theophylline derivatives of the present invention and their salts.

According to the present invention, aforesaid medicines may be prepared by the following procedures.

(A) In general, reaction between the compound (I) of the formula:

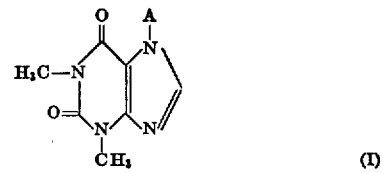

(I)

and the compound (II) of the formula:

(II)

wherein one of A and B represents hydrogen and another represents the group which react with said hydrogen to form alkylene group (Y), for example, haloalkyl (may have hydroxyl group or acyloxy group) or epoxyalkyl group, R and Y are as defined above.

(B) A part of the present compounds may be obtained by the following procedures.

(a) A compound (III) of abovementioned general formula in which R is H, that is, a compound of the formula:

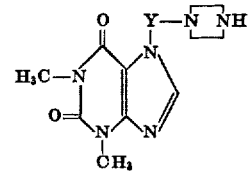

wherein Y is as defined above, may also be prepared by hydrolysis, reduction or cleavage of a compound in which R is a group —COX or —SO₂Z, that is, a compound of the formula:

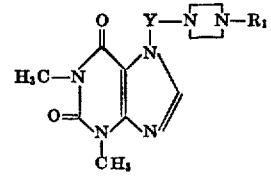

wherein Y is as defined above and R₁ represents a group —COX or a group —SO₂Z (wherein X and Z are as defined above).

(b) A compound (III) of abovementioned general formula in which R is a lower alkyl, a lower hydroxyalkyl, a lower aralkyl, a lower aralkyl containing a member selected from the group consisting of halogen, lower alkyl and lower alkoxy as a substituent in the aromatic nucleus, a lower alkenyl, a lower naphthylalkyl or 2-pyridyl alkyl, that is, a compound of the formula:

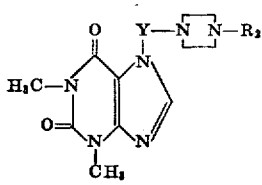

wherein $R_2$ represents a lower alkyl, a lower hydroxyalkyl, a lower aralkyl, a lower aralkyl containing a member selected from the group consisting of halogen, lower alkyl and lower alkoxy as a substituent in the aromatic nucleus, a lower alkenyl, a lower α-naphthyl alkyl or 2-pyridyl alkyl, may be also prepared by the reaction between a compound in which R is H, that is, a compound of the formula:

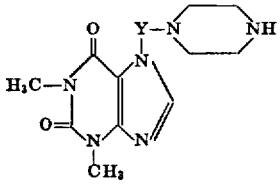

wherein Y is as defined above, and a compound (IV) which react with said compound to form $R_2$, that is to say, a halide, epoxy compound or vinyl compound having $R_2$ as fundamental skeleton.

(C) A compound (III) in which Y has acyloxy group may be also produced by usual acylation of a compound in which Y has hydroxyl group.

(D) Salts of the compound (III) may be produced by any conventional method.

The above mentioned processes will be explained more in detail as follows.

The condensation reaction between the compounds (I) and (II) in the process (A) is occasionally carried out in the absence of solvent. However, it is preferable to carry out the reaction under heating in the presence of solvent, for example, such as methanol, ethanol, isopropyl alcohol, benzene, toluene, xylene, dioxane, chloroform, carbon tetrachloride ethylene dichloride. The compounds (I) and (II) may be advantageously used in equal mol but in case A where the compound (I) is a haloalkyl group the yield would be improved by use of two times the equivalent of compound (II). In the case where either A or B is a haloalkyl group it is advisable to use as an dehydrohalogenating agent an inorganic alkali such as sodium hydroxide, potassium hydroxide, or an inorganic alkali metal salt such as anhydrous sodium carbonate or an organic tertiary amine, such as triethylamine. In particular since triethylamine acts also as a solvent it may be advantageously used. In case B, if compound (II) is a haloalkyl group A, compound (I) may be of an alkali metal atom.

For carrying out the method (B-a) the following three (1, 2, 3) procedures may be adopted. (1) Hydrolysis by means of mineral acids such as hydrochloric acid, sulfuric acid or inorganic alkalis such as caustic soda, caustic potassium or inorganic alkali metal salts such an anhydrous sodium carbonate, (2) elimination of R at room temperature or under heating in hydrogen bromide-acetic acid, (3) catalytic reduction by means of catalyst such as palladium urea, Raney nickel.

In carrying out the method (B-b), as the compound (IV), for example, ethyl chloride, ethylene oxide, 2-vinyl pyridine, isopropylbenzyl chloride, butyl bromide, allylbromide, p-methoxybenzyl chloride, p-chlorobenzyl chloride and the like may be used to give respectively corresponding compounds. Although the reaction proceeds in the absence of solvent, the reaction is preferably carried out in the presence of a solvent. For the solvent, it may be mentioned, for example, methanol, ethanol, isopropyl alcohol, benzene, toluene, dioxane, chloroform, carbon tetrachloride and the like. The reaction is advantageously carried out under heating. In general, the compound where R is H and compound (IV) may be used in equal mol amounts. In the case where compound (IV) is a halide, an inorganic alkali metal salts such as anhydrous sodium carbonate or tertiary amines such as triethylamine may be advantageously used as dehydrohalogenating agent. Particularly since triethylamine also acts as a solvent, it may be advantageously employed. Where compound (IV) is a vinyl compound, higher yield may be expected if glacial acetic acid is used as a solvent.

For an acylating agent in the method (C) it may be mentioned aliphatic carboxylic halides, for example, such as acetyl chloride, propionyl-chloride, phenylacetic chloride, aliphatic carboxylic acid anhydride, for erample, such as acetic anhydride, aromatic carboxylic chloride, for example, such as benzoyl chloride or organic carboxylic acid anhydride, for example, such as benzoic anhydride. The reaction is preferably carried out in the presence of a solvent which does not take part in the reaction, for example, benzene, ether, pyridine, toluene, xylene, ligroine, petroleum benzine, petroleum ether, chloroform, carbon tetrachloride, ethylene dichloride and the like. If a liquid acid anhydride is used as acylating agent, a solvent is not required. Although the reaction may be carried out at either room temperature or under heating, it is advisable to carry out the reaction under heating because it proceeds in a shorter time. In order to facilitate the reaction and to make the yield higher, zinc chloride, anhydrous sodium acetate, sulfuric acid, and the like, may be used as a catalyst.

The salts in the method (D) may be produced by any conventional methods. These salts are mineral acid salts, for example, such as hydrochloride, hydrobromide, phosphate, nitrate and organic acid salts, for example, such as maleate, fumarate, citrate, tartrate succinate, methanesulfonate, ethanedisulfonate, p-toluenesulfonate, and the like. Further, quaternary ammonium salt may be produced by reactive with methyl iodide.

The processes for producing the compounds of this invention are explained by the following examples:

EXAMPLE 1

To a mixture of 8.6 g. of 7-(β-bromoethyl)-theophylline and 9.0 g. of butylpiperazine were added 80 ml. of ethanol. The mixture was subjected to reflux for 6 hours under heating and stirring. After completion of the reaction ethanol was distilled off and the residue was dissolved in chloroform, washed with water and dried. After removal of chloroform by distillation 10.5 g. of 7-[β-(N⁴-butylpirazino)-ethyl]-theophylline were obtained. Recrystallize from ligroine yielded a pure product. M.P. 77–79° C.

Elemental analysis.—Calculated as $C_{17}H_{28}N_6O_2$ (percent): C, 58.60; H, 8.10; N, 24.12. Found (percent): C, 58.79; H, 7.89; N, 24.34.

EXAMPLES 2–5

The following products were obtained by the same manner as in Example 1.

TABLE 1

| Example Number | Product | Reactants Th.*—A (g.) | HN⟨ ⟩NR (g.) |
|---|---|---|---|
| 2 | 7-[β-(N⁴-allyl-piperazino)-ethyl]-theophylline. | A: —CH₂—CH₂—Br (8.6) | R: —CH—CH=CH₂ (8.2) |
| 3 | 7-[β-[N⁴-(γ-hydroxy-propyl)-piperazino-ethyl]-theophylline. | A: —CH₂—CH₂—Br (3.7) | R: —CH₂—CH₂—CH₂OH (4.1) |
| 4 | 7-[β-[N⁴-(p-chlorobenzyl)-piperazino-ethyl]-theophylline. | A: —CH₂—CH₂—Br (7.2) | R: —CH₂—⟨ ⟩—Cl (10.5) |
| 5 | 7-[γ-[N⁴-(β-hydroxyethyl)-piperazino propyl]-theophylline. | A: —CH₂—CH₂—CH₂Br (7.6) | R: —CH₂—CH₂—OH (6.5) |

| Example Number | Solvent used (ml.) | Yield (g.) | Calculated C | H | N | Found C | H | N | M.P. (° C.) |
|---|---|---|---|---|---|---|---|---|---|
| 2 | Ethanol (80) | 8.3 | As C₁₆H₂₄N₆O₂  57.81 | 7.28 | 25.28 | 57.92 | 7.25 | 25.00 | 87–88 (ligroin). |
| 3 | Ethanol (30) | 3.4 | As C₁₆H₂₆N₆O₃  54.84 | 7.48 | 23.98 | 54.96 | 7.59 | 24.15 | 114–115 (ethyl-acetate). |
| 4 | Ethanol (70) | 7.3 | As C₂₀H₂₅ClN₆O₂  57.61 | 6.04 | 20.16 | 57.85 | 6.06 | 20.19 | 152–152.5 (ethanol). |
| 5 | Ethanol (70) | 8.1 | As C₁₆H₂₆N₆O₃  54.84 | 7.48 | 23.98 | 54.69 | 7.44 | 23.85 | 80–82 (ethyl-acetate). |

*Th. denotes theophylline ring.

EXAMPLE 6

To a mixture of 7.2 g. of 7-(β-bromoethyl)-theophylline and 9.5 g. phenylethylpiperazine was added 70 ml. of ethanol. The mixture was treated in the same manner as in Example 1 to give 10.5 g. of crude 7-[β-(N⁴-phenyl-ethylpiperadino)ethyl]-theophylline. This crude product was dissolved in 50 ml. of absolute ethanol and to this solution absolute ethanol containing calculated amount of hydrogen chloride was added. The precipitate formed was collected by filtration to give 10 g. of 7-[β-(N⁴ - phenylethylpiperazino)-ethyl]-theophylline hydrochloride, which upon recrystallization from 80% ethanol decomposes at 264°–266° C.

Elemental analysis.—Calc. as $C_{21}H_{28}N_6O_2 \cdot 2HCl$ (percent): C, 53.73; H, 6.44; N, 17.90. Found (percent): C, 53.71; H, 6.38; N, 17.98.

EXAMPLE 7

6.5 g. of 7-(γ-chloropropyl)-theophylline and 6.4 g. of propylpiperazine were dissolved in 70 ml. of ethanol. The solution was treated in the same manner as in Example 1 to give 8.4 g. of 7-[γ-(N⁴-propylpiperazino)-propyl]-theophylline which recrystallizes from isopropyl ether. M.P. 72°–73° C.

Elemental analysis.—Calc. as $C_{17}H_{28}N_6O_2$ (percent): C, 58.59; H, 8.10; N, 24.12. Found (percent): C, 58.21; H, 7.98; N, 23.96.

1.0 g. of 7-[γ-(N⁴-propylpiperazino)-propyl]-theophylline thus obtained was dissolved in 5 ml. of absolute ethanol. To this solution, absolute ethanol containing calculated amount of hydrogen chloride was added. The precipitate was collected by filtration to give 1.0 g. of the corresponding hydrochloride which upon recrystallization from 90% ethanol, decomposes at 302°–303° C.

Elemental analysis.—Calc. as $C_{17}H_{28}N_6O_2 \cdot 2HCl$ (percent): C, 48.45; H, 4.18; N, 19.94. Found (percent): C, 48.30; H, 4.36; N, 20.31.

EXAMPLE 8

10 g. of 7-(γ-bromopropyl)-theophylline and 5.3 g. of benzylpiperazine were dissolved in 30 ml. of ethanol. The solution was treated in the same manner as in Example 6 to give 12.6 g. of 7-[γ-(N⁴-benzylpiperazino)propyl]-theophylline hydrochloride which upon recrystallization from ethanol decomposes at 284°–285° C.

Elemental analysis.—Calc. as $C_{21}H_{28}N_6O_2 \cdot 2HCl$ (percent): C, 53.73; H, 6.44; N, 17.90. Found (percent): C, 53.52; H, 6.72; N, 17.61.

EXAMPLE 9

A solution of 6.1 g. of 7-(β-chloroethyl)-theophylline, 6.3 g. of O-chlorobenzylpiperazine and 3.0 g. of anhydrous sodium carbonate in 72 ml. of ethanol was subjected to reflux for 6 hours under heating and stirring. After removal of insoluble matter by filtration, the mother liquor was dried under reduced pressure. This dried residue was recrystallized from methanol to give 7.2 g. of 7-[β-{N⁴-(o-chlorobenzyl)-piperazino}-ethyl] - theophylline. M.P. 159–5°–160.5° C.

Elemental analysis.—Calc. as $C_{20}H_{25}ClN_6O_2$ (percent): C, 57.61; H, 6.04; N, 20.16. Found (percent): C, 57.59; H, 6.17; N, 20.28.

EXAMPLE 10

A solution of 7.2 g. of 7- β-bromoethyl)-theophylline, 5.5 g. of m-chlorobenzylpiperazine and 2.6 g. of triethylamine in 70 ml. of ethanol was subjected to reflux for 6 hours under heating and stirring. After cooling the refluxed solution was concentrated under reduced pressure. The residue was washed with water and recrystallized from ethanol to give 8.4 g. of 7-[β-{N⁴-(m-chlorobenzyl)-piperazino}-ethyl]-theophylline.

Elemental analysis.—Calc. as $C_{20}H_{25}ClN_6O_2$ (percent): C, 57.61; H, 6.04; N, 20.16. Found (percent): C, 57.52; H, 6.13; N, 20.31.

EXAMPLE 11

1.8 g. of theophylline was added to a solution of 0.4 g. of caustic soda in 20 ml. of ethanol. To the mixture, a solution of 2.5 g. of $N^4$-benzyl-$N^1$-($\gamma$-chloropropyl)piperazine in 5 ml. of ethanol was dropped during 10 minutes under boiling and stirring and further refluxed for 7 hours under heating. After cooling insoluble matter was removed by filtration. The filtrate was concentrated and the residue was dissolved in 10 ml. of absolute ethanol. The solution was treated in the same manner as in Example 6 to give 3.0 g. of 7-[$\gamma$-($N^4$-benzylpiperazino)-propyl]-theorphylline hydrochloride which upon recrystallization from 80% methanol decomposes at 283°–284.5° C.

Elemental analysis.—Calc. as $C_{21}H_{28}O_6N_2 \cdot 2HCl$ (percent): C, 53.73; H, 6.44; N, 17.90. Found (percent): C, 53.49; H, 6.53; N, 17.71.

EXAMPLE 12

3.0 g. of theophylline was added to a solution of 0.6 g. of caustic soda in 30 ml. of ethanol. To the mixture under reflux with heating, a solution of 3.6 g. of $N^1$-benzyl $N^4$-($\beta$-chloroethyl)-piperazine in 10 ml. of ethanol was dropped during 15 minutes and subjected to reflux under heating for 7 hours. After cooling and removal of insoluble matter the mother liquor was concentrated to dryness. The dried product was recrystallized from ethanol to give 5 g. of 7-[$\beta$-($N^4$-benzylpiperazine)-ethyl]-theophylline. M.P. 120°–121° C.

Elemental analysis.—Calc. as $C_{20}H_{26}N_6O_2$ (percent): C, 62.81; H, 6.85; N, 21.97. Found (percent): C, 62.87; H, 6.82; N, 22.32.

1 g. of 7-[$\beta$-($N^4$-benzylpiperadino)-ethyl]-theophylline thus obtained was treated in the same manner as in Example 7 to give 1.1 g. of the corresponding hydrochloride which was recrystallized from 90% methanol and decomposed at 275°–276° C.

Elemental analysis.—Calc. as $C_{20}H_{26}N_6O_2 \cdot 2HCl \cdot H_2O$ (percent): C, 50.74; H, 6.39; N, 17.75. Found (percent): C, 50.81; H, 6.57; N, 17.67.

EXAMPLE 13

A solution of 6.0 g. of theophylline, 10 g. of $N^4$-(p-chlorobenzyl)-$N^1$-($\beta$-hydroxy-$\gamma$-chloropropyl)-piperazine and 2.4 g. of anhydrous potassium carbonate in 60 ml. of ethanol was subjected to reflux under heating and stirring for 8 hours. After completion of the reaction, insoluble matter was removed by filtration and the mother liquor was concentrated to dryness. The dried product was recrystallized from ethanol to give 12 g. of 7-[$\beta$-hydroxy-$\gamma$-{$N^4$-(p-chlorobenzyl)-piperazino}-propyl]-theophylline. M.P. 150°–151° C.

Elemental analysis.—Calc. as $C_{21}H_{27}ClN_6O_3$ (percent): C, 56.44; H, 6.09; N, 18.80. Found (percent): C, 56.31; H, 6.15; N, 18.99.

EXAMPLE 14

A solution of 7.2 of potassium theophylline and 10 g. of $N^4$-(p-chlorobenzyl)-$N^1$-($\beta$-hydroxy-$\gamma$-chloropropyl)-piperazine in 80 ml. of ethanol was subjected to reflux under heating for 8 hours. After removal of insoluble matter in warm state by filtration, the mother liquor was concentrated to dryness. The dried product was recrystallized from ethanol to give 11.0 g. of 7-[$\beta$-hydroxy-$\gamma$-{$N^4$-(p-chlorobenzyl)-piperazino}-propyl]-theophylline. M.P. 150°–151° C.

Elemental analysis.—Calc. as $C_{21}H_{27}ClN_6O_3$ (percent): C, 56.44; H, 6.09; N, 18.80. Found (percent): C, 56.52; H, 6.05; N, 19.00.

EXAMPLE 15

5.3 g. of theophylline and 6.5 g. of $N^1$-$\beta$,$\gamma$-epoxypropyl-$N^4$-butylpiperazine were added to 50 ml. of isopropanol and caused to react under heating on a water bath for 5 hours. After cooling, crystals deposited were collected by filtration and recrystallized from ethyl acetate to give 8.0 g. of 7-[$\beta$-hydroxy-$\gamma$-($N^4$-butylpiperazino)-propyl]-theophylline. M.P. 146°–147° C.

Elemental analysis.—Calc. as $C_{18}H_{32}N_6O_3$ (percent): C, 57.12; H, 7.99; N, 22.20. Found (percent): C, 57.09; H, 8.04; N, 22.17.

EXAMPLE 16

4.3 g. of 7-($\beta$,$\gamma$-epoxypropyl)-theophylline and 2.6 g. of ethylpiperazine were added to 43 ml. of ethanol and caused to react under heating on a water bath for 5 hours. After cooling, crystals deposited were collected by filtration and recrystallized from ethanol acetic acid (4:1) solution to give 5 g. of 7-[$\beta$-hydroxy-$\gamma$-($N^4$-ethylpiperazino)-propyl]-theophylline. M.P. 145°–145.5° C.

Elemental analysis.—Calc. as $C_{18}H_{28}N_6O_3$ (percent): C, 54.48; H, 7.48; N, 23.98. Found (percent): C, 55.16; H, 7.42; N, 23.93.

EXAMPLES 17–22

The following products were obtained by the same manner as in Example 16.

TABLE 2

| Example Number | Product | Reactants Th—A (g.) | HN⟨ ⟩N—R (g.) |
|---|---|---|---|
| 17 | 7-[$\beta$-hydroxy-$\gamma$-($N^4$-allyl-piperazino)-propyl]-theophylline. | A: —CH$_2$—CH—CH$_2$ \O/ (4.8) | R: —CH$_2$—CH=CH$_2$ (3.2) |
| 18 | 7-[$\beta$-hydroxy-$\gamma$-{$N^4$-($\beta$-hydroxyethyl)-piperazino}-propyl]-theophylline. | A: —CH$_2$—CH—CH$_2$ \O/ (3) | R: —CH$_2$—CH$_2$OH (2.5) |
| 19 | 7-[$\beta$-hydroxy-$\gamma$-{$N^4$-(p-chlorobenzyl)-piperazino}-propyl]-theophylline. | A: —CH$_2$—CH—CH$_2$ \O/ (4.7) | R: —CH$_2$—⟨ ⟩—Cl (6.3) |
| 20 | 7-[$\beta$-hydroxy-$\gamma$-($N^4$-phenylethylpiperazino)-propyl]-theophylline. | A: —CH$_2$—CH—CH$_2$ \O/ (20) | R: —CH$_2$—CH$_2$—⟨ ⟩ (24.5) |

TABLE 2.—Continued

| | | Reactants | |
|---|---|---|---|
| Example Number | Product | Th–A (g.) | HN⟨⟩N–R (g.) |
| 21 | 7-[β-hydroxy-γ-{N⁴-(p-methoxy-benzyl)-piperazino}-propyl]-theophylline. | A: –CH₂–CH–CH₂ \O/ (16.5) | R: –CH₂–⟨⟩–OCH₃ (17.3) |
| 22 | 7-[β-hydroxy-γ-{N⁴-(p-isopropyl-benzyl)-piprazino}-propyl]-theophylline. | A: –CH₂–CH–CH₂ \O/ (22.5) | R: –CH₂–⟨⟩–CH(CH₃)CH₃ (25) |

| | | | Properties of product | | | | | | |
|---|---|---|---|---|---|---|---|---|---|
| | | | Analysis percent | | | | | | |
| | | | Calculated | | | Found | | | |
| Example Number | Solvent used (ml.) | Yield (g.) | C | H | N | C | H | N | M.P. (° C.) |
| 17 | Ethanol (50) | 3.8 | As: C₁₇H₂₆N₆O₃ 56.33 7.23 22.92 | | | 56.61 | 7.33 | 23.19 | 140.5–141.0 (ethanol-acetic acid mixture). |
| 18 | Ethanol (30) | 4.5 | As: C₁₆H₂₆N₆O₄ 52.44 7.15 22.94 | | | 52.71 | 7.26 | 22.54 | 153.5–154.5 (ethanol-acetic acid mixture). |
| 19 | Ethanol (50) | 7.1 | As: C₂₁H₂₇ClN₆O₃ 56.44 6.09 18.80 | | | 56.51 | 6.17 | 19.20 | 150–151 (ethanol). |
| 20 | Ethanol (200) | 25.3 | As: C₂₂H₃₀N₆O₃ 61.95 7.09 19.70 | | | 61.87 | 7.12 | 19.87 | 148.5–149.5 (ethanol). |
| 21 | Ethanol (165) | 23.8 | As: C₂₂H₃₀N₆O₄ 59.71 6.83 18.99 | | | 59.34 | 6.71 | 18.99 | 151.5–152.5 (ethanol). |
| 22 | Ethanol (200) | 38.5 | As: C₂₄H₃₄N₆O₃ 63.41 7.54 18.49 | | | 63.22 | 7.46 | 18.37 | 177–178 (ethanol). |

EXAMPLE 23

5.3 g. of theophylline and 7.7 g. of N¹-β,γ-epoxypropyl-N⁴-benzylpiperazine were added to 50 ml. of ethanol. The mixture was treated in the same manner as in Example 15 and crystals deposited were recrystallized from ethanol to give 9.3 g. of 7-[β-hydroxy-γ-(N⁴-benzylpiperazino)-propyl]-theophylline. M.P. 175.5°–176° C.

Elmental analysis.—Calc. as C₂₁H₂₈N₆O₃ (percent): C, 61.14; H, 6.85; N, 26.37. Found (percent): C, 61.47; H, 6.94; N, 20.65.

EXAMPLE 24

4 g. of 7-(β,γ-epoxypropyl)-theophylline was caused to react with 4.2 g. of O-chlorobenzyl-piperazine at 70–80° C. for 5 hours under stirring. After cooling, the reaction product was recrystallized from methanol to give 6.5 g. of 7 - [β - hydroxy-γ-{N⁴-(O-chlorobenzyl)-piperazino}-propyl]-theophylline. M.P. 169°–170° C.

Elemental analysis.—Calc. as C₂₁H₂₇ClN₆O₃ (percent): C, 56.44; H, 6.09; N, 18.80. Found (percent): C, 56.48; H, 6.09; N, 19.17.

EXAMPLES 25–26

The following products were obtained by the same manner as in Example 24.

TABLE 3

| | | Reactants | | | Properties of product | | | | | | |
|---|---|---|---|---|---|---|---|---|---|---|---|
| | | | | | | Analysis, percent | | | | | |
| | | | | | | Calculated | | | Found | | |
| Ex. No. | Product | Th–A (g.) | HN⟨⟩N–R (g.) | | Yield (g.) | C | H | N | C | H | N | M.P. (° C.) |
| 25 | 7-[β-hydroxy-γ-{N⁴-(m-chlorobenzyl)-piperazino}-propyl]-theophylline. | A: –CH₂–CH–CH₂ \O/ (10.6) | R: –CH₂–⟨⟩-Cl (8.4) | | 14.8 | As: C₂₁H₂₇ClN₆O₃ 56.44 6.09 18.80 | | | 56.53 | 5.99 | 18.54 | 160–165 (ethanol). |
| 26 | 7-[β-hydroxy-γ-{N⁴-(p-methylbenzyl)-piperazino}-propyl]-theophylline. | A: –CH₂–CH–CH₂ \O/ (18.6) | R: –CH₂–⟨⟩–CH₃ (18) | | 24.5 | As: C₂₂H₃₀N₆O₃ 61.95 7.09 19.70 | | | 62.11 | 7.45 | 19.87 | 157–158 (ethanol). |

EXAMPLE 27

A solution of 7.6 g. of 7-(β-hydroxy-γ-chloropropyl)-theophylline and 7.8 g. of propylpiperazine in 70 ml. of isopropanol was subjected to reflux for 7 hours under heating and stirring. After completion of the reaction, ethanol was distilled off. The residue was dissolved in chloroform, washed with water and dried. Chloroform was distilled off to give an oily substance. This oily substance was added to ethanol-ethylacetate (4:1) solution to deposit crystals. By filtration of the mixture, 7.2 g. of 7-[β-hydroxy-γ-(N$^4$-propylpiperazino)-propyl]-theophylline was obtained M.P. 153–154° C.

Elemental analysis.—Calc. as $C_{17}H_{28}N_6O_3$ (percent): C, 56.02; H, 7.74; N, 23.06. Found (percent): C, 56.35; H, 7.68; N, 22.96.

EXAMPLE 28

5.1 g. of 7-(β-hydroxy-γ-bromopropyl)-theophylline, 2.7 g. of γ-hydroxypropylpiperazine and 2.2 g. of anhydrous sodium carbonate were added to 40 ml. of ethanol. The mixture was subjected to reflux under heating and stirring for 6 hours. The insoluble matter was collected in warm state by filtration and ethanol was distilled off under reduced pressure. Recrystallization of the residue from ethanol gave 4 g. of 7-[β-hydroxy-γ-{N$^4$-(γ-hydroxypropyl) - piperazino) - propyl]theophylline. M.P. 164–165° C.

Elemental analysis.—Calc. as $C_{17}H_{28}N_6O_4$ (percent): C, 53.67; H, 7.42; N, 22.09. Found (percent): C, 53.56; H, 7.43; N, 22.27.

EXAMPLE 29

To a suspension of 4.4 g. of theophylline and 3.2 g. of anhydrous potassium carbonate in 60 ml. of ethanol was added 5.4 g. of N$^1$-(β-hydroxy-γ-chloropropyl)-N$^4$-butylpiperazine which was obtained by reacting 4.6 g. of butylpiperazine with 3 g. of epichlorohydrin in 80 ml. of ethanol at 30° C. for 3 hours. The mixture was treated in the same manner as in Example 13 to give 6.4 g. of 7 - [β - hydroxy-γ-(N$^4$-butylpiperazino)-propyl]-theophylline. M.P. 144.5°–146.5° C.

Elemental analysis.—Calc. as $C_{18}H_{30}N_6O_3$ (percent): C, 57.12; H, 7.99; N, 22.20. Found (percent): C, 58.01; H, 7.76; N, 22.16.

EXAMPLE 30

16.3 g. of 7-(β-hydroxy-γ-chloropropyl)-theophylline and 29.6 g. of p-chlorobenzylpiperazine were added to 150 ml. of ethanol. The mixture was treated in the same manner as in Example 27 to give 21.2 g. of 7-[β-hydroxy-γ-{N$^4$-(p-chlorobenzyl)-piperazine}-propyl]-theophylline. Recrystallize from ethanol. M.P. 150°–151° C.

Elemental analysis.—Calc. as $C_{21}H_{27}ClN_6O_3$ (percent): C, 56.44; H, 6.09; N, 18.80. Found (percent): C, 56.23; H, 6.05; N, 18.91.

EXAMPLE 31

19 g. of 7-(β-hydroxy-γ-bromopropyl)-theophylline, 14.8 g. of m-chlorobenzylpiperazine and 7.1 g. of triethylamine were added to 153 ml. of ethanol. The mixture was subjected to reflux under heating and stirring for 6 hours. The residue, after distillation off of the solvent, was washed with water and recrystallized from ethanol to give 22.5 g. of 7-[β-hydroxy-γ-{N$^4$-(m-chlorobenzyl)-piperazino}-propyl]-theophylline. M.P. 160.5–161° C.

Elemental analysis.—Calc. as $C_{21}H_{27}ClN_6O_3$ (percent): C, 56.44; H, 6.09; N, 18.80. Found (percent): C, 56.31; H, 6.00; N, 18.65.

EXAMPLE 32

2.7 g. of 7-(β-hydroxy-γ-chloropropyl)-theophylline, 2.2 g. of p-isopropylbenzylpiperazine and 1.1 g. of triethylamine were added to 30 ml. of ethanol. The mixture was subjected to reflux under heating and stirring for 6 hours. After completion of the reaction and distillation off of the solvent, the residue was washed with water and recrystallized from ethanol to give 3.5 g. of 7-[β-hydroxy-γ - {N$^4$ - (p - isopropylbenzyl)-piperazino} - propyl]-theophylline. M.P. 177.5–178° C.

Elemental analysis.—Calc. as $C_{24}H_{34}N_6O_3$ (percent): C, 63.41; H, 7.54; N, 18.49. Found (percent): C, 63.35; H, 7.71; N, 18.26.

EXAMPLE 33

23 g. of 7-(β-hydroxy-γ-chloropropyl)-theophylline and 34.1 g. of phenylethylpiperazine were added to 200 ml. of ethanol. The mixture was treated in the same manner as in Example 27 to give 25.3 g. of 7-[β-hydroxy-γ-(N$^4$ - phenylethylpiperazino)-propyl]-theophylline. M.P. 147–149° C.

Elemental analysis.—Calc. as $C_{22}H_{30}N_6O_3$ (percent): C, 61.95; H, 7.09; N, 19.70. Found (percent): C, 61.72; H, 6.88; N, 20.03.

EXAMPLE 34

10.6 g. of 7-(β-hydroxy-γ-chloropropyl)-theophylline, 7.2 g. of o-chlorobenzylpiperazine and 2.8 g. of anhydrous potassium carbonate were added to 100 ml. of ethanol. The mixture was treated in the same manner as in Example 13 to give 14.2 g. of 7-[β-hydroxy-γ-{N$^4$-(o-chlorobenzyl) - piperazine} - propyl] - theophylline. M.P. 169–170° C.

Elemental analysis.—Calc. as $C_{21}H_{27}ClN_6O_3$ (percent): C, 56.44; H, 6.09; N, 18.80. Found (percent): C, 56.34; H, 6.14; N, 18.85.

EXAMPLE 35

5 g. of 7-(β,γ-epoxypropyl)-theophylline and 5 g. of α-naphthylmethylpiperazine were added to 50 ml. of ethanol and caused to react for 5 hours on a water bath. Removal of the solvent by distillation gave 9 g. of 7-[β-hydroxy - γ-{N$^4$-(d-naphthylmethyl)-piperazino}-propyl]-theophylline which was dissolved in a small amount of absolute ethanol. To the solution, absolute ethanol containing calculated amount hydrogen chloride was added and the precipitate formed was collected by filtration to give 9.5 g. of 7[β-hydroxy-γ-{N$^4$-(α-naphthylmethyl)-piperadino}-propyl]-theophylline which upon recrystallization from 80% ethanol decomposes at 272°–274° C.

Elemental analysis.—Calc. as $C_{25}H_{30}N_6O_3 \cdot 2HCl$ (percent): C, 56.07; H, 6.02; N, 15.69. Found (percent): C, 55.91; H, 6.28; N, 15.34.

EXAMPLE 36

6.3 g. of 7-(β-hydroxy-γ-chloropropyl)-theophylline and 8.9 g. of α-naphthylmethylpiperazine were subjected to reflux in 70 ml. of ethanol under heating, for 6 hours. After completion of the reaction and removal of ethanol by distillation, the residue was dissolved in chloroform, washed with water and dried. Removal of chloroform by distillation gave 7.4 g. of crude 7-[β-hydroxy-γ-{N$^4$-(α-naphthylmethyl) - piperazino}-propyl]-theophylline. The crude product was dissolved in a small amount of ethanol and treated in the same manner as in Example 35 to give 7.8 g. of 7-[β-hydroxy-γ-{N$^4$-(α-naphthylmethyl)-piperazino}-propyl]-theophylline hydrochloride which upon recrystallization from 80% ethanol decomposes at 273°–274° C.

Elemental analysis.—Calc. as $C_{25}H_{30}N_6O_3 \cdot 2HCl$ (percent): C, 56.07; H, 6.02; N, 15.69. Found (percent): C, 55.98; H, 6.01; N, 15.82.

EXAMPLE 37

2.2 g. of potassium theophylline and 3.2 g. of N$^1$-(β-hydroxy - γ - chloropropyl) - N$^4$-(α-naphthylmethyl)-piperazine were subjected to reflux in 30 ml. of ethanol for 8 hours under heating. After removal of insoluble matter, the mother liquor was concentrated to dryness to give 4.2 g. of crude 7-[β-hydroxy-γ-{N$^4$-(α-naphthylmethyl) - piperazino} - propyl]-theophylline. This crude product was dissolved in a small amount of absolute ethanol and treated in the same manner as in Example 35 to give 3.3 g. of 7-[β-hydroxy-γ-{N$^4$-(α-naphthylmethyl) - piperazino} - propyl]-theophylline hydrochloride which upon recrystallization from 80% ethanol decomposes at 271-273° C.

*Elemental analysis.*—Calc. as $C_{25}H_{30}N_6O_3 \cdot 2HCl$ (percent): C, 56.07; H, 6.02; N, 15.69. Found (percent): C, 56.03; H, 5.97; N, 15.54.

EXAMPLE 38

6.8 g. of 7-(β-hydroxy-γ-chloropropyl)-theophylline, 6.3 g. of α-naphthylmethylpiperazine and 2.7 g. of triethylamine were subjected to reflux in 70 ml. of ethanol for 8 hours under heating. After removal of the solvent, the residue was dissolved in chloroform, washed with water and concentrated to dryness to give 11.2 g. of crude 7 - [β - hydroxy - γ - {-(α-napthylmethyl)-piperazino}-propyl]-theophylline. This crude product was dissolved in a small amount of absolute ethanol and treated in the same manner as in Example 35 to give 11.6 g. of 7-[β-hydroxy - γ - {N⁴ - (α - naphthylmethyl)-piperazino}-propyl]-theophylline hydrochloride which upon recrystallization from 80% ethanol decomposes at 272°-274.5° C.

*Elemental analysis.*—Calc. as $C_{25}H_{30}N_6O_3 \cdot 2HCl$ (percent): C, 56.07; H, 6.02; N, 15.67. Found (percent): C, 56.15; H, 5.79; N, 15.82.

EXAMPLE 39

10 g. of 7-(β-hydroxy-γ-chloropropyl)-theophylline, 9 g. of α-naphthylmethylpiperazine and 3 g. of anhydrous potassium carbonate were subjected to reflux in 100 ml. of ethanol under heating and stirring. After removal of insoluble matter, the mother liquor was concentrated to dryness to give 15.8 g. of crude 7-[β-hydroxy-γ-{N⁴-(α-naphthylmethyl) - piperazino} - propyl] - theophylline. This crude product was dissolved in a small amount of absolute ethanol and treated in the same manner as in Example 35 to give 16.4 g. of 7-[β-hydroxy-γ-{N⁴-(α-naphthylmethyl)-piperazino}-propyl]-theophylline hydrochloride which when recrystallized from 80% ethanol decomposes at 272°-274° C.

*Elemental analysis.*—Calc. as $C_{25}H_{30}N_6O_3 \cdot 2HCl$ (percent): C, 56.07; H, 6.02; N, 15.69. Found (percent): C, 56.15; H, 5.99; N, 15.82.

EXAMPLE 40

4 g. of 7-(β,γ-epoxypropyl)-theophylline was caused to react with 3.9 g. of α-naphthylmethylpiperazine at 70-80° C. for 5 hours under stirring. After cooling, the sludgy reaction mixture was dissolved in a small amount of absolute ethanol. To the solution absolute ethanol containing calculated amount of hydrogen chloride was added and the precipitate formed was collected by filtration to give 4.6 g. of 7-[β-hydroxy-γ-{N⁴-(α-naphthylmethyl) - piperazino}-propyl]-theophylline hydrochloride which when recrystallized from 80% ethanol decomposes at 272.5°-273.5° C.

*Elemental analysis.*—Calc. as $C_{25}H_{30}N_6O_3 \cdot 2HCl$ (percent): C, 56.07; H, 6.02; N, 15.69. Found (percent): C, 55.97; H, 6.13; N, 15.49.

EXAMPLE 41

5:7 g. theophylline and 8.5 g. of N¹-(β,γ-epoxypropyl)-N⁴-(α-naphthylmethyl)-piperazine were subjected to reflux in 60 ml. of ethanol for 5 hours under heating. After removal of the solvent, the residue was treated in the same manner as in Example 40 to give 7.7 g. of 7-[β-hydroxy-γ - {N⁴ - (α-naphthylmethyl) - piperazino}-propyl]-theophylline hydrochloride which when recrystallized from 80% ethanol decomposes at 271°-273° C.

*Elemental analysis.*—Calc. as $C_{25}H_{30}N_6O_3 \cdot 2HCl$ (percent): C, 56.07; H, 6.02; N, 15.69. Found (percent): C, 55.87; H, 6.24; N, 15.50.

EXAMPLE 42

15 g. of 7 - (β - bromoethyl) - theophylline, 8.3 g. of ethoxycarbonylpiperazine and 5.6 g. of triethylamine were dissolved in 150 ml. of ethanol and the solution was subjected to reflux under heating for 8 hours. After removal of the solvent by distillation the residue was washed with water to give 16 g. of 7-[β-(N⁴-ethoxycarbonylpiperazino)-ethyl]-theophylline which is recrystallized from ethanol. M.P. 135.5°-137.5° C.

*Elemental analysis.*—Calc. as $C_{16}H_{24}N_6O_4$ (percent): C, 52.73; H, 6.64; N, 23.06. Found (percent): C, 52.43; H, 6.34; N, 23.18.

EXAMPLE 43

15 g. of 7 - (β - bromoethyl) - theophylline, 8.3 g. of ethoxycarbonylpiperazine and 7.2 g. of anhydrous potassium carbonate were subjected to reflux in 50 ml. of ethanol under heating for 8 hours. After removal of insoluble matter by filtration in warm state, the solvent was distilled off to give 16.5 g. of 7-[β-(N⁴-ethoxycarbonylpiperazino)-ethyl]-theophylline which is recrystallized from ethanol. M.P. 136°-137° C.

*Elemental analysis.*—Calc. as $C_{16}H_{24}N_6O_4$ (percent): C, 52.73; H, 6.64; N, 23.06. Found (percent): C, 52.55; H, 6.59; N, 22.98.

EXAMPLE 44

6 g. of theophylline was added to a solution of 1.2 g. of caustic soda in 60 ml. of ethanol and to the mixture, a solution of 7 g. of N¹-ethoxycarbonyl-N⁴-(β-chloroethyl)-piperazine in 10 ml. of ethanol was dropped during 15 minutes under reflux with heating and stirring and further refluxed for 7 hours under heating. After cooling insoluble matter was removed by filtration. The mother liquor was concentrated to dryness and the residue was recrystallized from ethanol to give 4.8 g. of 7-[β-(N⁴-ethoxycarbonylpiperazino) - ethyl] - theophylline. M.P. 136.5-137° C.

*Elemental analysis.*—Calc. as $C_{16}H_{24}N_6O_4$ (percent): C, 52.73; H, 6.64; N, 23.06. Found (percent): C, 52.68; H, 6.72; N, 23.10.

EXAMPLE 45

3.5 g. of 7-(β-bromoethyl)-theophylline and 3.4 g. of acetylpiperazine were subjected to reflux in 5 ml. of ethanol under heating for 8 hours. After completion of the reaction and removal of the solvent, the residue was dissolved in chloroform and washed with water and dried. Chloroform was distilled off to give 3 g. of 7-[β-(N⁴-acetylpiperazino)-ethyl]-theophylline which is recrystallized from ethyl acetate. M.P. 140-141° C.

*Elemental analysis.*—Calc. as $C_{15}H_{22}N_6O_3$ (percent): C, 53.88; H, 6.63; N, 25.14. Found (percent): C, 53.91; H, 6.52; N, 25.10.

EXAMPLE 46

5.5 g. of 7 - (β-bromoethyl) - theophylline, 3.6 g. of benzoylpiperazine and 1.9 g. of triethylamine were treated in 55 ml. of ethanol in the same manner as in Example 42 to give 1 g. of 7-[β-(N⁴-benzoylpiperazino)-ethyl]-theophylline which is recrystallized from ethyl acetate. M.P. 184°-185° C.

*Elemental analysis.*—Calc. as $C_{20}H_{24}N_6O_3$ (percent): C, 60.59; H, 6.10; N, 21.20. Found (percent): C, 60.58; H, 6.02; N, 20.99.

EXAMPLE 47

3.6 g. of potassium theophylline and 4.2 g. of N⁴-benzoyl-N¹-β-chloroethyl-piperazine were subjected to reflux in 40 ml. of ethanol under heating for 8 hours. After completion of the reaction, insoluble matter was removed by filtration and the mother liquor was concentrated to dryness. The residue was recrystallized from ethyl acetate to give 6.1 g. of 7-[β-(N⁴-benzoylpiperadino)-ethyl]-theophylline. M.P. 184°-185° C.

*Elemental analysis.*—Calc. as $C_{20}H_{24}N_6O_3$ (percent): C, 60.59; H, 6.10; N, 21.20. Found (percent): C, 60.33; H, 6.21; N, 21.53.

EXAMPLE 48

6 g. of 7-(β-bromoethyl)-theophylline, 1.9 g. of anhydrous piperazine and 2.3 g. of triethylamine were subjected to reflux in 60 ml. of ethanol under heating for 8 hours. After completion of the reaction and removal of the solvent by distillation, the residue was dissolved in chloroform and insoluble matter was removed. After washing with water and drying, chloroform was distilled off. The residue was extracted with ethanol and the solvent was distilled off to give 5.8 g. of crude 7-(β-piperazinoethyl)-theophylline. This crude product was dissolved in 20 ml. of absolute ethanol. To the solution ethanol solution of equivalent amount of p-toluene sulfonic acid was added and the crystals deposited were collected by filtration to give 10.5 g. of diparatoluene sulfonate of 7-(β-piperadinoethyl) - theophylline which decomposes at 223.5°–224.5° C.

Elemental analysis.—Calc. as $C_{27}H_{38}N_6O_8S_2$ (percent): C, 50.93; H, 5.70; N, 13.20. Found (percent): C, 51.12; H, 5.64; N, 13.61.

EXAMPLE 49

4.4 g. of potassium theophylline and 3 g. of β-chloroethylpiperazine were subjected to reflux in 60 ml. of ethanol under heating for 8 hours. After cooling, insoluble matter was filtered off and the mother liquor was concentrated to give 5.3 g. of crude 7-(β-piperadinoethyl)-theophylline. This crude product was dissolved in 20 ml. of absolute ethanol. To the solution, ethanol solution of equivalent amount of p-toluene sulfonic acid was added and the crystals deposited were collected by filtration to give 10 g. of diparatoluene sulfonate of 7-(β-piperazinoethyl)-theophylline which when recrystallized from ethanol decomposes at 222.5°–224° C.

Elemental analysis.—Calc. as $C_{27}H_{36}N_6O_8S_2$ (percent): C, 50.93; H, 5.70; N, 13.20. Found (percent): C, 50.79; H, 5.55; N, 13.19.

EXAMPLE 50

23.6 g. of 7-(β,γ-epoxypropyl)-theophylline and 19 g. of ethoxycarbonyl-piperazine were subjected to reflux in 230 ml. of ethanol under heating for 3 hours. After cooling, crystals deposited were collected by filtration to give 30.1 g. of 7-[β-hydroxy-γ-($N^4$-ethoxycarbonylpiperazino)-propyl]-theophylline which is recrystallized from ethanol. M.P. 178°–179° C.

Elemental analysis.—Calc. as $C_{17}H_{26}N_6O_5$ (percent): C, 51.77; H, 6.64; N, 21.31. Found (percent): C, 51.51; H, 6.63; N, 21.18.

EXAMPLE 51

3 g. of theophylline, 4.2 g. of $N^4$-ethoxycarbonyl-$N^1$-(β-hydroxy-γ-chloropropyl)-piperazine and 1.2 g. of anhydrous potassium carbonate were subjected to reflux in 60 ml. of ethanol under heating for 8 hours. After completion of the reaction, the reaction solution was filtered and the mother liquor was concentrated under reduced pressure. The residue was recrystallized from ethanol to give 5.2 g. of 7-[β-hydroxy-γ-($N^4$-ethoxycarbonylpiperazino)-propyl]-theophylline. M.P. 178°–179° C.

Elemental analysis.—Calc. as $C_{17}H_{26}N_6O_5$ (percent): C, 51.77; H, 6.64; N, 21.31. Found (percent): C, 51.82; H, 6.58; N, 21.14.

EXAMPLE 52

7.1 g. of 7-(β,γ-epoxypropyl)-theophylline and 6.8 g. of benzoylpiperazine were subjected to reflux in 70 ml. of ethanol under heating for 6 hours. After cooling, crystals deposited were collected by filtration to give 11.6 g. of 7 - [β - hydroxy-γ-($N^4$-benzoylpiperazino)-propyl]-theophylline which is recrystallized from butanol. M.P. 155°–156° C.

Elemental analysis.—Calc. as $C_{21}H_{26}N_6O_4$ (percent): C, 59.14; H, 6.15; N, 19.71. Found (percent): C, 59.43; H, 6.46; N, 19.62.

EXAMPLE 53

5.1 g. of 7-(β-hydroxy-γ-chloropropyl)-theophylline, 4 g. of benzoylpiperazin and 1.4 g. of anhydrous potassium carbonate were subjected to reflux in 60 ml. of ethanol under heating for 8 hours. After completion of reaction, insoluble matter was removed by filtration in warm state and the mother liquor was concentrated. The residue was recrystallized from butanol to give 6.4 g. of 7-[β-hydroxy-γ-($N^4$-benzoylpiperazino)-propyl]-theophylline.

Elemental analysis.—Calc. as $C_{21}H_{26}N_6O_4$ (percent): C, 59.14; H, 6.15; N, 19.71. Found (percent): C, 59.30; H, 6.23; N, 19.84.

EXAMPLE 54

4.3 g. of potassium theophylline and 5.6 g. of $N^4$-benzoyl - $N^1$-(β-hydroxy-γ-chloropropyl)-piperazine were subjected to reflux in 100 ml. of ethanol under heating for 8 hours. After completion of the reaction, insoluble matter was removed by filtration and the mother liquor was concentrated. The residue was recrystallized from butanol to give 5.2 g. of 7-[β-hydroxy-γ-($N^4$-benzoylpiperazino)-propyl]-theophylline. M.P. 154°–155° C.

Elemental analysis.—Calc. as $C_{21}H_{26}N_6O_4$ (percent): C, 59.14; H, 6.15; N, 19.71. Found (percent): C, 59.28; H, 6.10; N, 19.87.

EXAMPLE 55

1.8 g. of theophylline and 2.5 g. of $N^4$-benzoyl-$N^1$-(β,γ-epoxypropyl)-piperazine were subjected to reflux in 20 ml. of ethanol under heating for 7 hours. After completion of reaction, the solvent was removed by distillation under reduced pressure. The residue was recrystallized from ethanol to give 2.8 g. of 7-[β-hydroxy-γ-($N^4$-benzoylpiperazino)-propyl]-theophylline. M.P. 154°–155° C.

Elemental analysis.—Calc. as $C_{21}H_{26}N_6O_4$ (percent): C, 59.14; H, 6.15; N, 19.71. Found (percent): C, 59.02; H, 6.36; N, 19.68.

EXAMPLE 56

9 g. of 7-(β,γ-epoxypropyl)-theophylline and 5.4 g. of acetylpiperazine were subjected to reflux in 100 ml. of ethanol under heating for 7 hours. After completion of the reaction, the solvent was distilled off. The residue was recrystallized from ethanol to give 10 g. of 7-[β-hydroxy-γ-($N^4$ - acetylpiperazino) - propyl] - thiophylline. M.P. 174.5°–176.5° C.

Elemental analysis.—Calc. as $C_{16}H_{24}N_6O_4$ (percent): C, 52.75; H, 6.64; N, 23.06. Found (percent): C, 52.51; H, 6.40; N, 22.89.

EXAMPLE 57

7.7 g. of 7-(β-hydroxy-γ-chloropropyl)-theophylline, 3.8 g. of acetylpiperazine and 3 g. of triethylamine were subjected to reflux in 80 ml. of ethanol under heating for 8 hours. After completion of the reaction, the solvent was distilled off and the residue was washed with water and recrystallized from ethanol to give 6.5 g. of 7-[β-hydroxy-γ-($N^4$-acetylpiperazino)-propyl]-theophylline. M.P. 174°–176° C.

Elemental analysis.—Calc. as $C_{16}H_{24}N_6O_4$ (percent): C, 52.73; H, 6.64; N, 23.06. Found (percent): C, 52.63; H, 6.82; N, 23.19.

EXAMPLE 58

9.8 g. of 7-(β,γ-epoxypropyl)-theophylline and 5.2 g. of formylpiperazine were subjected to reflux in 100 ml. of ethanol under heating for 6 hours. After completion of the reaction, the solvent was distilled off. The residue was recrystallized from ethanol to give 10 g. of 7-[β-hydroxy-γ-($N^4$ - formylpiperazino) - propyl] - theophylline. M.P. 110°–111° C.

Elemental analysis.—Calc. as $C_{15}H_{22}N_6O_4$ (percent): C, 51.42; H, 6.33; N, 23.99. Found (percent): C, 51.27; H, 6.20; N, 24.10.

EXAMPLE 59

3.8 g. of 7-($\beta,\gamma$-epoxypropyl)-theophylline and 3.1 g. of benzoylpiperazine were reacted at 70°–80° C. for 5 hours under stirring. After cooling, the reaction product was recrystallized from ethanol to give 5.8 g. of 7-[$\beta$-hydroxy-$\gamma$-($N^4$ - benzoylpiperazino) - propyl] - theophylline. M.P. 154°–156° C.

*Elemental analysis.*—Calc. as $C_{21}H_{26}N_6O_4$ (percent): C, 59.14; H, 6.15; N, 19.71. Found (percent): C, 59.08; H, 6.23; N, 19.59.

EXAMPLE 60

A solution of 10 g. of 7-($\beta,\gamma$-epoxypropyl)-theophylline in 150 ml. of ethanol was dropped, under stirring and refluxing, into 66 ml. of ethanol solution of 16 g. of piperazine hexahydrate during 2 hours and the reflux was continued further for 5 hours. After cooling insoluble matter was filtered off and the solvent of the mother liquor was distilled off under reduced pressure to give 11 g. of crude 7-($\beta$-hydroxy-$\gamma$-piperazinopropyl)-theophylline. This crude product was dissolved in 10 ml. of ethanol. To the solution, ethanol solution of equivalent amount of p-toluenesulfonic acid was added to give di-p-toluenesulfonate of 7-($\beta$-hydroxy-$\gamma$-piperazinopropyl)-theophylline quantitatively which is recrystallized from ethanol and decomposes at 250.5°–251.5° C.

*Elemental analysis.*—Calc. as $C_{28}H_{38}N_6O_9S_2$ (percent): C, 50.43; H, 5.74; N, 12.63. Found (percent): C, 50.52; H, 5.75; N, 12.49.

EXAMPLE 61

19.8 g. of theophylline, 17.9 g. of $\beta$-hydroxy-$\gamma$-chloropropyl-piperazine and 1 g. of anhydrous potassium carbonate were subjected to reflux in 30 ml. of ethanol under heating for 8 hours. After completion of the reaction, insoluble matter was filtered off and the mother liquor was concentrated to give 32 g. of crude 7-$\beta$-hydroxy-$\gamma$-piperazinopropyl)-theophylline. This crude product was dissolved in 35 ml. of ethanol. To the solution, ethanol solution of equivalent amount of p-toluene sulfonic acid was added to give di-p-toluene-sulfonate of 7-($\beta$-hydrozy-$\gamma$-piperazinopropyl) - theophylline quantitatively which when recrystallized from ethanol decomposes at 250°–251° C.

*Elemental analysis.*—Calc. as $C_{28}H_{38}N_6O_9S_2$ (percent): C, 50.43; H, 5.74; N, 12.63. Found (percent): C, 50.52; H, 5.68; N, 12.60.

EXAMPLE 62

3.4 g. of 7-($\beta,\gamma$-epoxypropyl)-theophylline and 3.5 g. of p-toluenesulfonylpiperazine were added to 40 ml. of ethanol and subjected to reflux under heating for 7 hours. After cooling, the calculated amount of p-toluenesulfonic acid was added and heated. Crystals deposited was collected by filtration to give 8 g. of di - p-toluenesulfonate of 7 - [$\beta$ - hydroxy - $\gamma$ - ($N^4$ - p - toluenesulfonylpiperazino)-propyl]-theophylline which when recrystallized from ethanol decomposes at 162°–163° C.

*Elemental analysis.*—Calc. as $C_{35}H_{44}N_6O_{11}S_2$ (percent): C, 51.20; H, 5.40; N, 10.24; Found (percent): C, 50.99; H, 5.51; N, 10.22.

EXAMPLE 63

4.7 g. of 7-[$\beta$-($N^4$-ethoxycarbonylpiperazino)-ethyl]-theophylline obtained in Example 42 was dissolved in 47 ml. of conc. hydrochloric acid. The solution was subjected to reflux under heating for 15 hours to hydrolyse. After completion of the reaction, the residue was suspended in 50 ml. of absolute ethanol and into the solution ammonia gas was introduced. After removal of ammonium chloride produced, to the mother liquor was added ethanol solution of equivalent amount of p-toluenesulfonic acid. Crystals deposited were collected by filtration to give 5 g. of di-p-toluenesulfonate of 7-($\beta$-piperazinoethyl)-theophylline which when recrystallized from ethanol decomposes at 223°–224° C.

*Elemental analysis.*—Calc. as $C_{27}H_{36}N_6O_8S_2$ (percent): C, 50.93; H, 5.70; N, 13.20. Found (percent): C, 50.61; H, 5.53; N, 13.23.

EXAMPLE 64

To 2 g. of 7-[$\beta$-($N^4$-ethoxycarbonylpiperazino)-ethyl]-theophylline produced in Example 42, 20 ml. of 35% hydrogen bromide-acetic acid solution was added with stirring and heated at 60° C. for 3 hours to conduct reaction. After cooling, deposited and solidified product was obtained by filtration and suspended in 20 ml. of absolute ethanol. Ammonia gas was introduced into the suspension and ammonium chloride thus precipitated was removed by filtration. To the mother liquor, ethanol solution of equivalent amount of p-toluenesulfonic acid was added. Crystals thus deposited were collected by filtration to give 2.1 g. of di-p-toluenesulfonate of 7-($\beta$-piperazino-ethyl)-theophylline which when recrystallized from ethanol decomposes at 223°–224.5° C.

*Elemental analysis.*—Calc. as $C_{27}H_{36}N_6O_8S_2$ (percent): C, 50.93; H, 5.70; N, 13.20. Found (percent): C, 50.61; H, 5.53; N, 13.23.

EXAMPLE 65

2 g. of 7-[$\beta$-($N^4$-acetylpiperazino)-ethyl]-theophylline obtained in Example 45 was dissolved in 20 ml. of conc. hydrochloric acid and treated in the same manner as in Example 63 to give 2.1 g. of di-p-toluenesulfonate of 7-[$\beta$-piperazinoethyl]-theophylline which when recrystallized from ethanol decomposes at 223.5–224° C.

*Elemental analysis.*—Calc. as $C_{27}H_{36}N_6O_8S_2$ (percent): C, 50.93; H, 5.70; N, 13.20. Found (percent): C, 50.82; H, 5.62; N, 13.21.

EXAMPLE 66

2 g. of 7-[$\beta$-($N^4$-benzoylpiperazino)-ethyl]-theophylline produced in Example 46 was dissolved in 20 ml. of conc. hydrochloric acid and was subjected to reflux under heating for 15 hours to hydrolyse. After cooling, benzoic acid thus deposited was filtered off and the mother liquor was concentrated under reduced pressure to dryness. The residue was suspended in absolute ethanol and ammonium chloride deposited by introducing ammonia gas into the suspension was removed by filtration. To the mother liquor, ethanol solution of equivalent amount of p-toluenesulfonic acid was added, to give 2 g. of di-p-toluenesulfonate of 7-($\beta$-piperazinoethyl)-theophylline which when recrystallized from ethanol decomposes at 223°–224° C.

*Elemental analysis.*—Calc. as $C_{27}H_{36}N_6O_8S_2$ (percent): C, 50.93; H, 5.70; N, 13.20. Found (percent): C, 50.82; H, 5.62; N, 13.21.

EXAMPLE 67

2 g. of 7-[$\beta$-($N^4$-formylpiperazino)-ethyl]-theophylline was subjected to reflux in 10% caustic soda solution under heating for 3 hours to hydrolyse. After cooling, the reaction product was subjected to salting out with glanular caustic soda and extracted with chloroform. After removal of chloroform by distillation, the residue was dissolved in 10 ml. of absolute ethanol. To the solution, ethanol solution of equivalent amount of p-toluenesulfonic acid was added. Crystals thus deposited were collected by filtration to give 2 g. of di-p-toluenesulfonate of 7-($\beta$-piperazinoethyl)-theophylline which when recrystallized from ethanol decomposes at 223°–224° C.

*Elemental analysis.*—Calc. as $C_{27}H_{36}N_6O_8S_2$ (percent): C, 50.93; H, 5.70; N, 13.20. Found (percent): C, 50.85; H, 5.67; N, 13.33.

EXAMPLE 68

5 g. of 7-[$\beta$-hydroxy-$\gamma$-($N^4$-ethoxycarbonylpiperazino)-propyl]-theophylline produced in Example 50 was dissolved in 50 ml. of conc. hydrochloric acid and treated in the same manner as in Example 63 to give 7.5 g. of di-p-toluenesulfonate of 7-($\beta$-hydroxy-$\gamma$-piperazinopropyl)-theophylline which when recrystallized from ethanol decomposes at 250°–251° C.

*Elemental analysis.*—Calc. as $C_{28}H_{38}N_6O_9S_2$ (percent): C, 50.43; H, 5.74; N, 12.63. Found (percent): C, 50.48; H, 5.70; N, 12.63.

EXAMPLE 69

20 ml. of 35% hydrogen bromide-acetic acid solution was added with stirring to 2 g. of 7-[β-hydroxy-γ-(N⁴-ethoxycarbonylpiperazino)-propyl]-theophylline produced in Example 50 and treated in the same manner as in Example 64 to give 3.1 g. of di-p-toluenesulfonate of 7 - (β-hydroxy-γ-piperazino-propyl)-theophylline which when recrystallized from ethanol decomposes at 249.5°–250.5° C.

*Elemental analysis.*—Calc. as $C_{28}H_{38}N_6O_9S_2$ (percent): C, 50.43; H, 5.74; N, 12.63. Found (percent): C, 50.25; H, 5.64; N, 12.57.

EXAMPLE 70

3.5 g. of 7-[β-hydroxy-γ-(N⁴-benzoylpiperazino)-propyl]-theophylline produced in Example 52 was dissolved in 35 ml. of conc. hydrochloric acid and subjected to reflux under heating for 15 hours. After cooling, benzoic acid deposited was removed by filtration and also trace of benzoic acid was extracted from the mother liquor with ether. The mother liquor was concentrated under reduced pressure to dryness and then treated in the same manner as in Example 68 to give 4.8 g. of di-p-toluenesulfonate of 7-[β-hydroxy-γ-(piperazino)-propyl]-theophylline which when recrystallized from ethanol decomposes at 249.5°–250.5° C.

*Elemental analysis.*—Calc. as $C_{28}H_{38}N_6O_9S_2$ (percent): C, 50.43; H, 5.74; N, 12.63. Found (percent): C, 50.38; H, 5.55; N, 12.71.

EXAMPLE 71

A solution of 2 g. of 7-[β-hydroxy-γ-(N⁴-acetylpiperazino)-propyl]-theophylline produced in Example 56 in 20 ml. of conc. hydrochloric acid was subjected to reflux under heating for 15 hours. After completion of the reaction, the solvent was distilled off and the residual solid matter was suspended in absolute ethanol. Ammonium chloride deposited by introducing ammonia gas into the suspension was removed by filtration and the mother liquor was concentrated to give 1.5 g. of crude 7-[β-hydroxy-γ-piperazino-propyl]-theophylline. The crude product was dissolved in 5 ml. of ethanol and to the solution, ethanol solution of equivalent amount of p-toluenesulfonic acid was added to give 2.8 g. of 7-[β-hydroxy-γ-piperazino-propyl]-theophylline which when recrystallized from ethanol decomposes at 250°–251° C.

*Elemental analysis.*—Calc. as $C_{28}H_{38}N_6O_9S_2$ (percent): C, 50.43; H, 5.74; N, 12.63. Found (percent): C, 50.43; H, 5.68; N, 12.72.

EXAMPLE 72

5.6 g. of 7-[β-hydroxy-γ-(N⁴-formylpiperazino)-propyl]-theophylline produced in Example 58 was subjected to reflux in 60 ml. of conc. hydrochloric acid under heating for 15 hours to hydrolyse and treated in the same manner as in Example 71 to give 0.7 g. of di-p-toluenesulfonate of 7 - (β-hydroxy-γ-piperazinopropyl)-theophylline which decomposes at 249.5°–250.5° C.

*Elemental analysis.*—Calc. as $C_{28}H_{38}N_6O_9S_2$ (percent): C, 50.43; H, 5.74; N, 12.63. Found (percent): C, 50.24; H, 5.82; N, 12.71.

EXAMPLE 73

9.4 g. of 7-[β-(N⁴-ethoxycarbonylpiperazino)-ethyl]-theophylline was added to 94 ml. of conc. hydrochloric acid and heated to hydrolyse. 4.4 g. of the crude 7-(β-piperazinoethyl)-theophylline thus obtained, 2.5 g. of p-chlorobenzylchloride and 1.6 g. of triethylamine were added to 50 ml. of ethanol and the mixture was subjected to reflux under heating for 8 hours. After completion of the reaction, the solvent was distilled off and the residue was washed with water, recrystallized from ethanol to give 5 g. of 7-[β-(N⁴-p-chlorobenzylpiperazino)-ethyl]-theophylline. M.P. 151.5°–152.5° C.

*Elemental analysis.*—Calc. as $C_{20}H_{25}ClN_6O_2$ (percent): C, 57.61; H, 6.04; N, 20.16. Found (percent): C, 57.55; H, 6.02; N, 20.20.

EXAMPLE 74

6.4 g. of 7-(β-piperazinoethyl)-theophylline-di-p-toluenesulfonate was suspended in 64 ml. of ethanol. Ammonia gas was introduced into the suspension to obtain a free base. Ammonium sulfonate formed was removed by filtration. To the mother liquor, 1.7 g. of p-chlorobenzylchloride and 2.1 g. of anhydrous potassium carbonate were added and subjected to reflux under heating for 8 hours. Insoluble matter was removed by filtration and the mother liquor was concentrated to give 3.8 g. of 7-[β-{N⁴-(p-chlorobenzyl)-piperazino}-ethyl] - theophylline which was recrystallized from ethanol. M.P. 152°–153° C.

*Elemental analysis.*—Calc. as $C_{20}H_{25}ClN_6O_2$ (percent): C, 57.61; H, 6.04; N, 20.16. Found (percent): C, 57.63; H, 6.06; N, 20.15.

EXAMPLE 75

4.7 g. of 7-[β-(N⁴-ethoxycarbonylpiperazino)-ethyl]-theophylline was added to 47 ml. of conc. hydrochloric acid and heated to hydrolyse. 2.2 g. of the crude 7-β-piperazinoethyltheophylline thus obtained, 1.1 g. of butylbromide and 0.8 g. of triethylamine were added 25 ml. of ethanol and treated in the same manner as in Example 73 to give 2.1 g. of 7-[β-(N⁴-butylpiperazino)-ethyl]-theophylline which was recrystallized from ligroin. M.P. 78°–79° C.

*Elemental analysis.*—Calc. as $C_{17}H_{28}N_6O_2$ (percent): C, 58.60; H, 8.10; N, 24.12. Found (percent): C, 58.80; H, 8.05; N, 24.23.

EXAMPLE 76

4 g. of 7-[β-(N⁴-ethoxycarbonylpiperazino)-ethyl]-theophylline was added to 40 ml. of conc. hydrochloric acid and heated to hydrolyze. 1.8 g. of the crude 7-(β-piperazino-ethyl)-theophylline thus obtained, 0.6 g. of trimethylenechlorohydrine and 0.5 g. of anhydrous potassium carbonate were added to 20 ml. of ethanol and treated in the same manner as in Example 74 to give 2 g. of 7 - [β-{N⁴-(hydroxypropyl)-piperazino}-ethyl]-theophylline which was recrystallized from ethanol. M.P. 163°–164° C.

*Elemental analysis.*—Calc. as $C_{17}H_{28}N_6O_4$ (percent): C, 53.67; H, 7.42; N, 22.09. Found (percent): C, 53.60; H, 7.48; N, 22.07.

EXAMPLE 77

5 g. of 7 - [β-(N⁴-ethoxycarbonylpiperazino)-ethyl]-theophylline was added to 20 g. of 5% hydrogen bromide-glacial acetic acid solution and heated at 60° C. to hydrolyze. 2.4 g. of the crude 7-(β-piperazino-ethyl)-theophylline thus obtained, 1.4 g. of o-chlorobenzylchloride and 0.6 g. of anhydrous potassium carbonate were added to 30 ml. of ethanol and treated in the same manner as in Example 74 to give 2.7 g. of 7 - [β-{N⁴-(o-chlorobenzyl)-piperazino}-ethyl]-theophylline which was recrystallized from ethanol. M.P. 159°–160° C.

*Elemental analysis.*—Calc. as $C_{20}H_{25}ClN_6O_2$ (percent): C, 57.61; H, 6.04; N, 20.16. Found (percent): C, 57.63; H, 6.00; N, 20.15.

EXAMPLE 78

10 g. of 7-[β-(N⁴-acetylpiperazino)-ethyl]-theophylline was added to 100 ml. of conc. hydrochloric acid and heated to hydrolyze. 4.8 g. of the crude 7-(β-piperazinoethyl)-theophylline thus obtained, 2.1 g. of benzylchloride, and 1.7 g. of triethylamine were added to 50 ml. of ethanol and treated in the same manner as in Example 73 to give 5.4 g. of 7-[β-(N⁴-benzylpiperazino)-ethyl]-theophylline which was recrystallized from ethanol. M.P. 120°–121° C.

*Elemental analysis.*—Calc. as $C_{20}H_{26}N_6O_2$ (percent): C, 62.81; H, 6.85; N, 21.97. Found (percent): C, 62.74; H, 6.90; N, 22.01.

1 g. of 7-[β-($N^4$-benzylpiperazino)-ethyl]-theophylline thus obtained was dissolved in 5 ml. of absolute ethanol and to the solution absolute ethanol containing calculated amount of hydrogen chloride was added. The precipitate formed was collected by filtration to give 1 g. of 7-[β-($N^4$-benzylpiperazino)-ethyl]-theophylline di-hydrochloride which upon recrystallization from 90% ethanol decomposes at 275°–276° C.

*Elemental analysis.*—Calc. as $C_{20}H_{26}N_6O_2 \cdot 2HCl \cdot H_2O$ (percent): C, 50.74; H, 6.39; N, 17.75. Found (percent): C, 50.85; H, 6.32; N, 17.82.

EXAMPLE 79

4.7 g. of crude 7-(β-piperazinoethyl)-theophylline, obtained by hydrolyzing 7.2 g. of 7-[β-($N^4$-formylpiperazino)-ethyl]-theophylline with 80 ml. of 10% caustic soda, was dissolved in 5 ml. of methanol. Into the solution under reflux with heating, 0.8 g. of ethylene oxide was introduced during 2 hours and further continued the reflux for 30 minutes. The solvent was distilled off to give 3.8 g. of crude 7-[β-{$N^4$-(β-hydroxyethyl)-piperazino}-ethyl]-theophylline which was dissolved in 20 ml. of absolute ethanol and to the solution absolute ethanol containing calculated amount of hydrogen chloride was added. The precipitate thus formed was collected by filtration to give 6.9 g. of 7-[β-{$N^4$-(β-hydroxyethyl)-piperazino}-ethyl]-theophylline di-hydrochloride which upon recrystallization from ethanol decomposes at 268°–269° C.

*Elemental analysis.*—Calc. as $C_{15}H_{24}N_6O_3 \cdot 2HCl \cdot H_2O$ (percent): C, 42.16; H, 6.60; N, 19.66. Found (percent): C, 42.11; H, 6.62; N, 19.55.

EXAMPLE 80

10 g. of 7-[β-hydroxy-γ-($N^4$-ethoxycarbonylpiperazino)-propyl]-theophylline was hydrolyzed under heating at 80° C. with 40 g. of 32% hydrogen bromide-glacial acetic acid. 7.8 g. of the crude 7-(β-hydroxy-γ-piperazinopropyl)-theophylline thus obtained, 3.9 g. of p-chlorobenzyl chloride and 1.9 g. of anhydrous potassium carbonate were added to 80 ml. of ethanol and treated in the same manner as in Example 74 to give 9.4 g. of 7-[β-hydroxy-γ-{$N^4$-(p-chlorobenzyl)-piperazino}-propyl]-theophylline which was recrystallized from ethanol. M.P. 150°–151° C.

*Elemental analysis.*—Calc. as $C_{21}H_{27}ClN_6O_3$ (percent): C, 56.44; H, 6.09; N, 18.80. Found (percent): C, 56.58; H, 6.00; N, 19.12.

EXAMPLE 81

5 g. of 7-[β-hydroxy-γ-($N^4$-ethoxycarbonylpiperazino)-propyl]-theophylline was hydrolyzed under heating with 50 ml. of conc. hydrochloric acid. 4.1 g. of the crude 7-(β-hydroxy-γ-piperazino-propyl)theophylline thus obtained, 2.1 g. of p-isopropylbenzyl chloride and 1.3 g. of triethylamine were added to 50 ml. of ethanol and treated in the same manner as in Example 73 to give 4.6 g. of 7-[β-hydroxy-γ-{$N^4$-(p-isopropylbenzyl)-piperazino}-propyl]-theophylline which was recrystallized from ethanol. M.P. 177°–178° C.

*Elemental analysis.*—Calc. as $C_{24}H_{34}N_6O_3$ (percent): C, 63.41; H, 7.54; N, 18.49. Found (percent): C, 63.25; H, 7.56; N, 18.50.

EXAMPLE 82

Into a suspension of 10 g. of 7-(β-hydroxy-γ-piperazino-propyl)-theophylline di-p-toluenesulfonate in 100 ml. of ethanol, ammonia gas was introduced to give free base. Ammonium sulfonate thus formed was removed by filtration. To the mother liquor 2.5 g. of o-chlorobenzyl chloride and 3.4 g. of anhydrous potassium carbonate were added and treated in the same manner as in Example 74 to give 5.4 g. of 7-[β-hydroxy-γ-{$N^4$-(o-chlorobenzyl)-piperazino}-propyl]-theophylline which was recrystallized from ethanol. M.P. 170°–171° C.

*Elemental analysis.*—Calc. as $C_{21}H_{27}ClN_6O_3$ (percent): C, 56.44; H, 6.09; N, 18.80. Found (percent): C, 56.52; H, 6.17; N, 18.94.

EXAMPLE 83

10 g. of 7-(β,γ-epoxypropyl)-theophylline and 16 g. of piperazinohexahydrate were caused to react in 200 ml. of ethanol. 11 g. of the crude 7-(β-hydroxy-γ-piperazinopropyl)-theophylline thus obtained, 4.8 g. of p-methylbenzyl chloride and 2.5 g. of anhydrous potassium carbonate were added to 100 ml. of ethanol and treated in the same manner as in Example 74 to give 11 g. of 7-[β-hydroxy-γ-{$N^4$-(p-methylbenzyl)-piperazino}-propyl]-theophylline which was recrystallized from ethanol. M.P. 155°–156.5° C.

*Elemental analysis.*—Calc. as $C_{22}H_{30}N_6O_3$ (percent): C, 61.95; H, 7.09; N, 19.70. Found (percent): C, 62.10; H, 6.98; N, 19.87.

EXAMPLE 84

7 g. of 7-[β-hydroxy-γ-($N^4$-acetylpiperazino)-propyl]-theophylline was added to 80 ml. of conc. hydrochloric acid and heated to hydrolyse. 4 g. of the crude 7-(β-hydroxy-γ-piperazinopropyl)-theophylline thus obtained, 1.6 g. of benzylchloride and 1.3 g. of triethylamine were added to 50 ml. of ethanol and treated in the same manner as in Example 73 to give 4.1 g. of 7-[β-hydroxy-γ-($N^4$-benzylpiperazino)-propyl]-theophylline which was recrystallized from ethanol. M.P. 175°–176° C.

*Elemental analysis.*—Calc. as $C_{21}H_{28}N_6O_3$ (percent): C, 61.14; H, 6.85; N, 20.37. Found (percent): C, 61.37; H, 6.90; N, 20.68.

EXAMPLE 85

2 g. of 7-[β-hydroxy-γ-($N^4$-acetylpiperazino)-propyl]-theophylline was added to 20 ml. of conc. hydrochloric acid and heated to hydrolyse. 1.5 g. of the crude 7-(β-hydroxy-γ-piperazinopropyl)-theophylline thus obtained, 0.7 g. of butyl bromide and 0.4 g. of anhydrous potassium carbonate were added to 15 ml. of ethanol and treated in the same manner as in Example 74 to give 1.2 g. of 7-[β-hydroxy-γ-($N^4$-butylpiperazino)-propyl]-theophylline which was recrystallized from ethyl acetate. M.P. 146°–147° C.

*Elemental analysis.*—Calc. as $C_{18}H_{30}N_6O_3$ (percent): C, 57.12; H, 7.99; N, 22.20. Found (percent): C, 57.08; H, 8.12; N, 21.99.

EXAMPLE 86

In 100 ml. of methanol was dissolved 6.7 g. of 7-(β-hydroxy-γ-piperazinopropyl)-theophylline di-p-toluenesulfonate into which ammonia gas was introduced to allow conversion into free base and the resulting ammonium sulfonate was filtered off. To the filtrate 0.5 g. of ethylene oxide was introduced and treated in the same manner as in Example 79 to give 2.7 g. of 7-[β-hydroxy-γ-{$N^4$-(γ-hydroxyethyl)-piperazino}-propyl]-theophylline. M.P. 153°–154° C.

*Elemental analysis.*—Calc. as $C_{16}H_{26}N_6O_4$ (percent): C, 52.44; H, 7.15; N, 22.94. Found (percent): C, 52.65; H, 7.08; N, 23.01.

EXAMPLE 87

7 g. of 7-[β-hydroxy-γ-($N^4$-benzoylpiperazino)-propyl]-theophylline was added to 100 ml. of conc. hydrochloric acid and heated to hydrolyse. 4.5 g. of 7-(β-hydroxy-γ-piperazinopropyl)-theophylline thus obtained, 1.7 g. of allylbromide and 1 g. of anhydrous potassium carbonate were added to 50 ml. of ethanol and treated in the same manner as in Example 74 to give 3.5 g. of 7-[β-hydroxy-γ-($N^4$-allylpiperazino)-propyl]-theophylline which was recrystallized from ethanol. M.P. 140°–141° C.

*Elemental analysis.*—Calc. as $C_{17}H_{26}N_6O_3$ (percent): C, 56.33; H, 7.23; N, 22.92. Found (percent): C, 56.35, H, 7.41; N, 22.76.

EXAMPLE 88

7 g. of 7-[β-hydroxy-γ-(N⁴-benzoylpiperazino)-propyl]-theophylline was added to 70 ml. of conc. hydrochloric acid and heated to hydrolyse. 3.2 g. of 7-(β-hydroxy-γ-piperazinopropyl)-theophylline thus obtained, 1.6 g. of p-methoxybenzylchloride and 1.1 g. of triethylamine were added to 40 ml. of ethanol and treated in the same manner as in Example 73 to give 3.5 g. of 7-[β-hydroxy-γ - {N⁴-(p-methoxybenzyl)-piperazino}-propyl]-theophylline which was recrystallized from methanol. M.P. 151.5°–152.5° C.

*Elemental analysis.*—Calc. as $C_{22}H_{30}N_6O_4$ (percent): C, 59.71; H, 6.83; N, 18.99. Found (percent): C, 59.62; H, 6.81; N, 19.15.

EXAMPLE 89

5.6 g. of 7-[β-hydroxy-γ-(N⁴-formylpiperazino)-propyl]-theophylline was added to 60 ml. of 10% caustic soda solution and hydrolyzed. 3 g. of the crude 7-(β-hydroxy-γ-piperazino-propyl)-theophylline thus obtained, 1.4 g. of phenylethylchloride and 0.7 g. of anhydrous potassium carbonate were added to 30 ml. of ethanol and treated in the same manner as in Example 74 to give 3 g. of 7-[β-hydroxy-γ-(N⁴-phenylethylpiperazino)-propyl]-theophylline which was recrystallized from ethanol. M.P. 148.5–149.5° C.

*Elemental analysis.*—Calc. as $C_{22}H_{30}N_6O_3$ (percent): C, 61.95; H, 7.09; N, 19.70. Found (percent): C, 61.81; H, 7.23; N, 19.65.

EXAMPLE 90

To 60 ml. ethanol was suspended 10 g. of 7-(β-hydroxy-γ - piperazino-propyl)-theophylline di-p-toluenesulfonate into which ammonia gas was introduced to allow conversion into free base and the resulting ammonium sulfonate was filtered off. To the filtrate were added 1.6 g. of 2-vinylpyridine and 0.9 g. of glacial acetic acid and subjected to reflux under heating for 7 hours. After distillation of the solvent, the residue was dissolved in chloroform and washed with 10% caustic soda solution and subsequently with water and dried. After removal of chloroform by distillation, the residue was recrystallized from ethyl acetate to give 5.1 g. of 7-[β-hydroxy-γ-{N⁴-(2-pyridylethyl)-piperazino}-propyl]-theophylline. M.P. 169.5–170.5° C.

*Elemental analysis.*—Calc. as $C_{21}H_{29}N_7O_3$ (percent): Calc. C, 59.00; H, 6.84; N, 22.93. Found (percent): C, 59.10; H, 6.86; N, 22.92.

EXAMPLE 91

18 g. of β-hydroxy-γ-chloropropyl-piperazine and 7.2 g. of anhydrous potassium carbonate were added to 30 ml. of ethanol to react. 32 g. of 7-[(β-hydroxy-γ-piperazino)-propyl]-theophylline thus obtained, 16 g. of p-chlorobenzylchloride and 11 g. of triethylamine were added to 40 ml. of ethanol and treated in the same manner as in Example 74 to give 33 g. of 7-[β-hydroxy-γ-{N⁴-(p-chlorobenzyl) - piperazino} - propyl]-theophylline which was recrystallized from ethanol. M.P. 149°–151° C.

*Elemental analysis.*—Calc. as $C_{21}H_{27}N_6O_3$ (percent): C, 56.44; H, 6.09; N, 18.80. Found (percent): C, 56.32; H. 6.21; N, 18.87.

EXAMPLE 92

10 g. of 7-[β-hydroxy-γ-(N-formylpiperazino)-propyl]-theophylline was added to 100 ml. of conc. hydrochloric acid and heated to hydrolyse. 4.4 g. of the crude 7-(β-hydroxy-γ-piperazino-propyl)-theophylline thus obtained, 2.2 g. of m-chlorobenzylchloride and 1 g. anhydrous potassium carbonate were added to 50 ml. of ethanol and treated in the same manner as in Example 74 to give 4.7 g. of 7-[β-hydroxy-γ-{N⁴-(m-chlorobenzyl)-piperazino}-propyl]-theophylline which was recrystallized from ethanol. M.P. 160°–160.5° C.

*Elemental analysis.*—Calc. as $C_{21}H_{27}ClN_6O_3$ (percent): C, 56.44; H, 6.09; N, 18.80. Found (percent): C, 56.32; H, 6.16; N, 18.93.

EXAMPLE 93

10.7 g. of 7-[β-hydroxy-γ-(N⁴-ethoxycarbonylpiperizino)-propyl]-theophylline was added to 150 ml. of conc. hydrochloric acid and heated to hydrolyse. 5 g. of 7-(β-hydroxy-γ-piperazino-propyl]-theophylline thus obtained, 3.9 g. of α-chloromethylnaphthalene and 3.7 g. of anhydrous potassium carbonate were added to 100 ml. of ethanol and treated in the same manner as in Example 74 to give 7.2 g. of crude 7-[β-hydroxy-γ-{N⁴-(α-naphthalenomethyl)-piperazino}-propyl]-theophylline. The resultant product was then dissolved in 70 ml. of absolute ethanol containing a calculated amount of hydrogen chloride and the precipitate thus formed was filtered off to give 6 g. of 7 - [β-hydroxy-γ-{N⁴-(α-naphthalenomethyl)-piperazino}-propyl]-theophylline dihydrochloride which when recrystallized from 80% ethanol decomposes at 272°–274° C.

*Elemental analysis.*—Calc. as $C_{25}H_{30}N_6O_3 \cdot 2HCl$ (percent): C, 56.07; H, 6.02; N, 15.69. Found (percent): C, 55.81; H, 6.28; N, 15.34.

EXAMPLE 94

To 75 ml. of anhydrous ether were added 7.4 g. of 7-[β-hydroxy-γ-{N⁴-(m-chlorobenzyl)-piperazino}-propyl]-theophylline obtained in Example 25 and 2.9 g. of benzoyl chloride and subjected to reflux for 10 hours under heating and stirring. After cooling, benzene was distilled off and the residue was dissolved in chloroform, treated with 10% sodium carbonate solution, washed with water and dried. After distilling off chloroform, the residue was recrystallized from methanol to give 9 g. of 7-[β-benzoyloxy - γ - {N⁴-(m-chlorobenzyl)-piperazino}-propyl]-theophylline. M.P. 139.5°–140° C.

*Elemental analysis.*—Calc. as $C_{28}H_{31}ClN_6O_4$ (percent): C, 61.03; H, 5.67; N, 15.25. Found (percent): C, 60.77; H, 5.56; N, 14.97.

EXAMPLE 95

In 15 ml. of dried pyridine was dissolved 7 g. of 7-[β-hydroxy - γ - {N⁴-(p-methylbenzyl)-piperazino}-propyl]-theophylline obtained in Example 26 and into the solution 3 g. of benzyl chloride was dropped under ice cooling and stirring and subsequently heated at 50° C. for 4 hours. After cooling, the resulting precipitate was dissolved in chloroform, treated with 10% sodium carbonate solution, washed with water and dried. After removal of the solvent by distillation, the residue was recrystallized from methanol to give 7.6 g. of 7-[β-benzoyloxy-γ-{N⁴-(p-methylbenzyl) - piperazino} - propyl]-theophylline. M.P. 122–123° C.

*Elemental analysis.*—Calc. as $C_{29}H_{34}N_6O_4$ (percent): C, 65.64; H, 6.64; N, 15.84. Found (percent): C, 65.46; H, 6.63; N, 15.63.

Example 96

To 75 ml. of anhydrous benzene were added 7.5 g. of 7-[β-hydroxy-γ-(N⁴-benzyl-piperazino)-propyl] - theophylline obtained in Example 23 and 3.1 g. of benzoylchloride and subjected to reflux for 6 hours under heating and stirring. Benzene was then distilled off and the residue was dissolved in chloroform, treated with 10% sodium carbonate solution, washed with water and dried. After removal of chloroform by distillation, the residue was recrystallized from methanol to give 6.5 g. of 7-[β-benzoyloxy-γ-(N⁴-benzyl-piperazino)-propyl]-theophylline. M.P. 149°–150.5° C.

*Elemental analysis.*—Calc. as $C_{28}H_{32}N_6O_4$ (percent): C, 65.10; H, 6.24; N, 16.27. Found (percent): C, 64.99; H, 6.32; N, 16.21.

EXAMPLES 97 TO 108

The following products were obtained in the same manner as in Example 96.

TABLE 4

| Example Number | Product | Theophylline derivatives (g.) | Obtained by Ex. No. |
|---|---|---|---|
| 97 | 7-[β-benzoyloxy-γ-{N⁴-(p-chlorobenzyl)-piperazino}-propyl]-theophylline. | 7-[β-hydroxy-γ-{N⁴-(p-chlorobenzyl)-piperazino}-propyl]-theophylline (8.2). | 19 |
| 98 | 7-[β-benzoyloxy-γ-{N⁴-(o-chlorobenzyl)-piperazino}-propyl]-theophylline. | 7-[β-hydroxy-γ-{N⁴-(o-chlorobenzyl)-piperazino}-propyl]-theophylline (10). | 24 |
| 99 | 7-[β-benzoyloxy-γ-(N⁴-phenyl-ethyl-piperazino) propyl]-theophylline. | 7-[β-hydroxy-γ-(N⁴-phenyl ethyl piperazino)-propyl]-theophylline (8). | 20 |
| 100 | 7-[β-benzoyloxy-γ-{N⁴-(p-isopropylbenzyl)-piperazino}-propyl]-theophylline. | 7-[β-hydroxy-γ-{N⁴-(p-isopropylbenzyl)-piperazino}-propyl]-theophylline (7). | 22 |
| 101 | 7-[β-benzoyloxy-γ-(N⁴-p-chlorobenzyl-hydrazino)-propyl]-theophylline. | 7-[β-hydroxy-γ-(N⁴-p-chlorobenzyl piperazino)-propyl]-theophylline (4.1.) | 80 |
| 102 | 7-(β-benzoyloxy-γ-(N⁴-p-isopropyl-benzyl piperazino)-propyl]-theophylline. | 7-[β-hydroxy-γ-(N⁴-p-isopropyl benzyl piperazino)-propyl]-theophylline (2). | 81 |
| 103 | 7-[β-benzoyloxy-γ-(N⁴-o-chlorobenz l piperazino)-propyl]-theophylline. | 7-[β-hydroxy-γ-(N⁴-o-chlorobenzyl piperazino)-propyl]-theophylline (3). | 82 |
| 104 | 7-[β-benzoyloxy-γ-(N⁴-p-methyl benzyl piperazino)-propyl]-theophylline. | 7-[β-hydroxy-γ-(N⁴-p-methyl benzyl piperazino)-propyl]-theophylline (5). | 83 |
| 105 | 7-[β-benzoyloxy-γ-(N⁴-benzyl piperazino)-propyl]-theophylline. | 7-[β-hydroxy-γ-(N⁴-benzyl piperazino)-propyl]-theophylline (3.7). | 84 |
| 106 | 7-[β-benzoyloxy-γ-(N⁴-phenyl ethyl piperazino)-propyl]-theophylline. | 7-[β-hydroxy-γ-(N⁴-phenyl ethyl piperazino)-propyl]-theophylline (1.5). | 89 |
| 107 | 7-[β-benzoyloxy-γ-(N⁴-m-chlorobenzyl piperazino)-propyl]-theophylline. | 7-[β-hydroxy-γ-(N⁴-m-chlorobenzyl piperazino)-propyl]-theophylline (2). | 92 |
| 108 | 7-[β-benzoyloxy-γ-(N⁴-ethoxy carbonyl piperazino)-propyl]-theophylline. | 7-[β-hydroxy-γ-(N⁴-ethoxy carbonyl piperazino)-propyl]-theophylline (5). | 50 |

Properties of product

| Example Number | Benzoyl chloride used (g.) | Solvent used (ml.) | Yield (g.) | Analysis, percent — Calculated | | | Analysis, percent — Found | | | M.P. (° C.) |
|---|---|---|---|---|---|---|---|---|---|---|
| | | | | C | H | N | C | H | N | |
| 97 | 3.1 | Anhydrous benzene (81) | 7.3 | As: $C_{28}H_{31}ClN_6O_4$ 61.03 | 5.67 | 15.25 | 61.18 | 5.63 | 15.25 | 155–157 (methanol). |
| 98 | 5 | Anhydrous benzene (100) | 9.1 | As: $C_{28}H_{31}ClN_6O_4$ 61.03 | 5.67 | 15.25 | 60.89 | 5.63 | 14.91 | 141–142 (methanol). |
| 99 | 3.3 | Anhydrous benzene (80) | 9.7 | As: $C_{29}H_{34}N_6O_4$ 65.64 | 6.46 | 15.84 | 65.37 | 6.47 | 15.16 | 155.5–156.5 (methanol). |
| 100 | 2.5 | Anhydrous benzene (70) | 7 | As: $C_{31}H_{38}N_6O_4$ 66.65 | 6.86 | 15.04 | 66.39 | 6.93 | 14.98 | 91–92 (methanol). |
| 101 | 1.6 | Anhydrous benzene (40) | 3.6 | As: $C_{28}H_{31}ClN_6O_4$ 61.03 | 5.67 | 15.25 | 61.21 | 5.65 | 15.13 | 155–156 (methanol). |
| 102 | 2.1 | Anhydrous benzene (20) | 2.1 | As: $C_{31}H_{38}N_6O_4$ 66.65 | 6.86 | 15.04 | 66.79 | 7.00 | 15.15 | 91–92 (methanol). |
| 103 | 1 | Anhydrous benzene (30) | 2.8 | As: $C_{28}H_{31}ClN_6O_4$ 61.03 | 5.67 | 15.25 | 61.11 | 5.72 | 15.31 | 141–142 (methanol). |
| 104 | 1.6 | Anhydrous benzene (50) | 5.5 | As: $C_{29}H_{34}N_6O_4$ 65.64 | 6.46 | 15.84 | 65.55 | 6.32 | 15.99 | 149.5–150.5 (methanol). |
| 105 | 1.6 | Anhydrous benzene (38) | 3.3 | As: $C_{28}H_{32}N_6O_4$ 65.10 | 6.24 | 16.27 | 65.22 | 6.38 | 16.15 | 149.5–150.5 (methanol). |
| 106 | 1.5 | Anhydrous benzene (20) | 1.5 | As: $C_{29}H_{34}N_6O_4$ 65.64 | 6.46 | 15.84 | 65.78 | 6.50 | 15.71 | 155.5–156.5 (methanol). |
| 107 | 1.8 | Anhydrous benzene (20) | 1.8 | As: $C_{28}H_{31}ClN_6O_4$ 61.03 | 5.67 | 15.25 | 61.21 | 5.82 | 15.33 | 139–140 (methanol). |
| 108 | 2.2 | Anhydrous benzene (50) | 5.1 | As: $C_{24}H_{30}N_6O_6$ 57.82 | 6.07 | 16.86 | 57.77 | 6.05 | 16.92 | 176–177 (methanol). |

EXAMPLE 109

10 g. of 7-[β-hydroxy-γ-(N⁴-benzylpiperazino)-propyl]-theophylline obtained in Example 23, 5 g. of anhydrous sodium acetate were added to 50 ml. of acetic anhydric and subjected to reflux under heating and stirring for 5 hours. After cooling, the reaction product was filtered and the mother liquor was concentrated under reduced pressure. The residue was recrystallized from ethyl acetate to give 1.8 g. of 7-[β-acetyloxy-γ-(N⁴-benzylpiperazino)-propyl]-theophylline. M.P. 153°–154° C.

*Elemental analysis.*—Calc. as $C_{23}H_{30}N_6O_4$ (percent): C, 60.78; H, 6.65; N, 18.49. Found (percent): C, 61.13; H, 6.55; N, 18.56.

EXAMPLES 110–120

The following products were obtained in the same way as described in Example 96.

the acid-addition salts and quaternary ammonium salts thereof, wherein R is selected from the group consisting of benzyl, methylbenzyl, isopropylbenzyl, chlorobenzyl and phenylethyl, and R' is selected from the group consisting of hydrogen, acetyl and benzyl.

2. The compound according to claim 1 which is: 7-[β-hydroxy - γ - {N⁴ - (o-chlorobenzyl)-piperazino}-propyl]-theophylline.

TABLE 5

| Example Number | Product | Theophylline derivatives (g.) | Obtained by Ex. No. |
|---|---|---|---|
| 110 | 7-[β-acetyloxy-γ-{N⁴-(p-chlorobenzyl)-piperazino}-propyl]-theophylline. | 7-[β-hydroxy-γ-{N⁴-(p-chlorobenzyl)-piperazino}-propyl]-theophylline (2). | 19 |
| 111 | 7-[β-acetyloxy-γ-{N⁴-(m-chlorobenzyl)-piperazino}-propyl]-theophylline. | 7-β-hydroxy-γ-N⁴-(m-chlorobenzyl)-piperazino-propyl-theophylline (10). | 31 |
| 112 | 7-[β-acetyloxy-γ{-N⁴-(p-isopropyl benzyl)-piperazino}-propyl]-theophylline. | 7-[β-hydroxy-γ-{N⁴-(p-isopropyl benzyl)-piperazino}-propyl]-theophylline (10). | 32 |
| 113 | 7-[β-acetyloxy-γ-(N⁴-phenyl ethyl piperazino)-propyl]-theophylline. | 7-[β-hydroxy-γ-(N⁴-phenyl ethyl piperazino)-propyl]-theophylline (9). | 33 |
| 114 | 7-[β-acetyloxy-γ-(N⁴-p-chlorobenzyl piperazino)-propyl]-theophylline. | 7-[β-hydroxy-γ-(N⁴-p-chlorobenzyl piperazino)-propyl]-theophylline (5). | 80 |
| 115 | 7-[β-acetyloxy-γ-(N⁴-p-isopropyl benzyl piperazino)-propyl]-theophylline. | 7-[β-hydroxy-γ-(N⁴-p-isopropyl benzyl piperazino)-propyl]-theophylline (2). | 81 |
| 116 | 7-[β-acetyloxy-γ-(N⁴-o-chlorobenzyl piperazino-propyl]-theophylline. | 7-[β-hydroxy-γ-(N⁴-o-chlorobenzyl piperazino-propyl]-theophylline (2). | 82 |
| 117 | 7-[β-acetyloxy-γ-(N⁴-benzyl piperazino)-propyl]-theophylline. | 7-[β-hydroxy-γ-(N⁴-benzyl piperazino)-propyl]-theophylline (2). | 84 |
| 118 | 7-[β-acetyloxy-γ-(N⁴-phenyl ethyl piperazino)-propyl]-theophylline. | 7-[β-hydroxy-γ-(N⁴-phenyl ethyl piperazino)-propyl]-theophylline (1.5). | 89 |
| 119 | 7-[β-acetyloxy-γ-{N⁴-(m-chlorobenzyl)-piperazino}-propyl]-theophylline. | 7-[β-hydroxy-γ-{N⁴-(m-chlorobenzyl)-piperazino}-propyl]-theophylline (2). | 92 |
| 120 | 7-[β-acetyloxy-γ-(N⁴-ethoxy carbonyl-piperazino)-propyl]-theophylline. | 7-[β-hydroxy-γ-(N⁴-ethoxy carbonyl-piperazino)-propyl]-theophylline (5). | 50 |

| | | | | Properties of product | | | | | | |
|---|---|---|---|---|---|---|---|---|---|---|
| | | | | Analysis, percent | | | | | | |
| | Anhydrous | Acetic | | Calculated | | | Found | | | |
| Example Number | sodium acetate (g.) | anhydride (ml.) | Yield (g.) | C | H | N | C | H | N | M.P. (° C.) |
| 110 | 1 | 10 | 1.8 | As $C_{23}H_{29}ClN_6O_4$ 56.50 | 5.98 | 17.19 | 56.29 | 5.88 | 17.23 | 148–149 (ethyl acetate). |
| 111 | 5 | 50 | 10.4 | As $C_{23}H_{29}ClN_6O_4$ 56.50 | 5.98 | 17.19 | 56.42 | 6.21 | 17.30 | 152–153 (ethyl acetate). |
| 112 | 5 | 50 | 8.3 | As $C_{26}H_{36}N_6O_4$ 62.88 | 7.31 | 16.92 | 62.71 | 7.25 | 17.13 | 134–135 (ethyl acetate). |
| 113 | 4.5 | 45 | 7 | As $C_{24}H_{32}N_6O_4$ 61.51 | 6.88 | 17.94 | 61.39 | 6.92 | 17.78 | 133–134 (ethyl acetate). |
| 114 | 2.5 | 25 | 4.5 | As $C_{23}H_{29}ClN_6O_4$ 56.50 | 5.98 | 17.19 | 56.31 | 6.01 | 17.14 | 148.5–149 (ethyl acetate). |
| 115 | 1 | 10 | 1.7 | As $C_{26}H_{36}N_6O_4$ 62.88 | 7.31 | 16.92 | 62.81 | 7.11 | 16.76 | 134–135 (methanol). |
| 116 | 1 | 10 | 1.5 | As $C_{23}H_{29}ClN_6O_4$ 56.50 | 5.98 | 17.19 | 56.62 | 5.87 | 17.13 | 158–160 (ethyl acetate). |
| 117 | 1 | 10 | 1.5 | As $C_{23}H_{30}N_6O_4$ 60.78 | 6.65 | 18.49 | 60.66 | 6.61 | 18.49 | 153–154 (ethyl acetate). |
| 118 | 0.8 | 8 | 1.1 | As $C_{24}H_{32}N_6O_4$ 61.51 | 6.88 | 17.94 | 61.23 | 6.75 | 17.84 | 133.5–134.5 (ethyl acetate). |
| 119 | 1 | 10 | 1.5 | As $C_{23}H_{29}ClN_6O_4$ 56.50 | 5.98 | 17.19 | 56.29 | 6.03 | 17.20 | 152.5–153.5 (ethyl acetate). |
| 120 | 2.5 | 25 | 5 | As $C_{19}H_{28}N_6O_4$ 52.28 | 6.47 | 19.26 | 52.20 | 6.46 | 19.23 | 128–129 (ethyl acetate). |

What is claimed is:

1. A compound selected from the group consisting of:

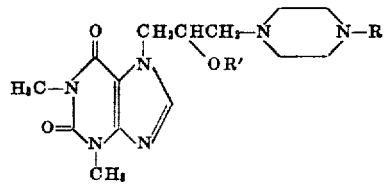

and the acid-addition salts and quaternary ammonium salts thereof, wherein R is selected from the group consisting of benzyl, methylbenzyl, isopropylbenzyl, chlorobenzyl and phenylethyl, and R' is selected from the group consisting of hydrogen, acetyl and benzyl.

3. The compound according to claim 1 which is: 7-[β-hydroxy - γ - {N⁴-(m-chlorobenzyl)-piperazino}-propyl]-theophylline.

4. The compound according to claim 1 which is: 7-[β-hydroxy - γ - {N⁴ - (p-chlorobenzyl)-piperazino}-propyl]-theophylline.

5. The compound according to claim 1 which is: 7-[β-hydroxy - γ - {N⁴-(p-methylbenzyl)-piperazino}-propyl]-theophylline.

6. The compound according to claim 1 which is: 7-[β-hydroxy - γ-{N⁴-(p-isopropylbenzyl)-piperazino}-propyl]-theophylline.

7. The compound according to claim 1 which is: 7-[β-hydroxy - γ-{N⁴-(p-methoxybenzyl)-piperazino}-propyl]-theophylline.

8. The compound according to claim 1 which is: 7-[β-hydroxy - γ - (N⁴ - phenylethylpiperazino)-propyl]-theophylline.

9. The compound according to claim 1 which is: 7-[β-benzoyloxy - γ - (N⁴-benzylpiperazino)-propyl]-theophylline.

10. The compound according to claim 1 which is: 7-[β-benzoyloxy - γ-{N⁴-(o-chlorobenzyl)-piperazino}-propyl]-theophylline.

11. The compound according to claim 1 which is: 7-[β-benzoyloxy - γ - {N⁴ - (m-chlorobenzyl)-piperazino}-propyl]-theophylline.

12. The compound according to claim 1 which is: 7-[β-benzoyloxy - γ-{N⁴-(p-chlorobenzyl)-piperazino}-propyl]-theophylline.

13. The compound according to claim 1 which is: 7-[β-benzoyloxy - γ - {N⁴ - (p-methylbenzyl)-piperazino}-propyl]-theophylline.

14. The compound according to claim 1 which is: 7-[β-benzoyloxy - γ-{N⁴-(p-isopropylbenzyl)-piperazino}-propyl]-theophylline.

15. The compound according to claim 1 which is: 7-[β-benzoyloxy - γ-(N⁴-phenyl-ethyl-piperazino)-propyl]-theophylline.

16. The compound according to claim 1 which is: 7-[β-acetylozy - γ-(N⁴-benzylpiperazino)-propyl]-theophylline.

17. The compound according to claim 1 which is: 7-[β-acetyloxy - γ - {N⁴-(o-chlorobenzyl)-piperazino}-propyl]-theophylline.

18. The compound according to claim 1 which is: 7-[β-acetyloxy - γ-{N⁴-(m-chlorobenzyl)-piperazino}-propyl]-theophylline.

19. The compound according to claim 1 which is: 7-[β-acetyloxy - γ - {N⁴-(p-chlorobenzyl)-piperazino}-propyl]-theophylline.

20. The compound according to claim 1 which is: 7-[β-acetyloxy - γ - {N⁴ - (p-isopropylbenzyl)-piperazino}-propyl]-theophylline.

21. The compound according to claim 1 which is: 7-[β-acetyloxy - γ - (N⁴ - phenylethylpiperazino)-propyl]-theophylline.

References Cited
UNITED STATES PATENTS

| | | | |
|---|---|---|---|
| 2,641,598 | 6/1953 | Moussalli et al. | 260—253 |
| 2,924,598 | 2/1960 | Bestean et al. | 260—253 |
| 3,124,579 | 3/1964 | Yoshida et al. | 260—256 |

NICHOLAS S. RIZZO, Primary Examiner

A. M. TIGHE, Assistant Examiner